(12) United States Patent
Fujii et al.

(10) Patent No.: US 11,441,734 B2
(45) Date of Patent: Sep. 13, 2022

(54) METHOD OF PRODUCING HIGH-PRESSURE TANK, AND HIGH-PRESSURE TANK

(71) Applicant: TOYOTA JIDOSHA KABUSHIKI KAISHA, Toyota (JP)

(72) Inventors: Manabu Fujii, Toyota (JP); Naoki Ueda, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 98 days.

(21) Appl. No.: 17/173,255

(22) Filed: Feb. 11, 2021

(65) Prior Publication Data

US 2021/0293380 A1 Sep. 23, 2021

(30) Foreign Application Priority Data

Mar. 17, 2020 (JP) .............................. JP2020-046355
Sep. 15, 2020 (JP) .............................. JP2020-155018

(51) Int. Cl.
*F17C 1/16* (2006.01)
*B29C 70/32* (2006.01)
(Continued)

(52) U.S. Cl.
CPC .............. *F17C 1/16* (2013.01); *B29C 70/205* (2013.01); *B29C 70/326* (2013.01); *B29C 70/84* (2013.01); *F17C 13/04* (2013.01); *B29K 2101/10* (2013.01); *B29K 2101/12* (2013.01); *B29K 2307/04* (2013.01); *B29K 2995/0067* (2013.01);
(Continued)

(58) Field of Classification Search
CPC ..... B29C 70/205; B29C 70/326; B29C 70/84; F17C 1/16; F17C 13/04
USPC .............. 220/590, 589, 588, 586; 242/610.6, 242/475.4, 475.1, 470; 156/192, 191, 184
See application file for complete search history.

(56) References Cited

U.S. PATENT DOCUMENTS

| 2,744,043 A * | 5/1956 | Ramberg .............. B29C 53/822 220/560.04 |
| 5,385,263 A * | 1/1995 | Kirk .......................... F17C 1/16 206/443 |

(Continued)

FOREIGN PATENT DOCUMENTS

| JP | 2012-063015 A | 3/2012 |
| JP | 2016-142349 A | 8/2016 |

(Continued)

*Primary Examiner* — Robert J Hicks
(74) *Attorney, Agent, or Firm* — Finnegan, Henderson, Farabow, Garrett & Dunner, LLP

(57) ABSTRACT

A method of producing a high-pressure tank including a liner and a reinforcement layer made of fiber-reinforced resin includes a process of forming at least a domed member included in the reinforcement layer. The process includes placing first fiber bundles to form a part of a protruding portion and a part of a domed main body, and placing second fiber bundles to cover the first fiber bundles. The first fiber bundles are placed, such that a fiber direction of the first fiber bundles in the protruding portion follows an axial direction of the protruding portion, and resin with which the fiber bundles are impregnated is solidified while the first fiber bundles are being placed. The second fiber bundles are placed, such that the fiber direction of the second fiber bundles intersects with the fiber direction of the first fiber bundles.

7 Claims, 16 Drawing Sheets

(51) Int. Cl.
    *B29C 70/20*     (2006.01)
    *F17C 13/04*     (2006.01)
    *B29C 70/84*     (2006.01)
    *B29K 101/12*     (2006.01)
    *B29K 101/10*     (2006.01)
    *B29K 307/04*     (2006.01)
    *B29L 31/00*     (2006.01)

(52) U.S. Cl.
    CPC ............... *B29L 2031/7156* (2013.01); *F17C 2201/0109* (2013.01); *F17C 2203/012* (2013.01); *F17C 2203/0604* (2013.01); *F17C 2203/0621* (2013.01); *F17C 2203/0668* (2013.01); *F17C 2205/0323* (2013.01); *F17C 2209/2163* (2013.01); *F17C 2209/232* (2013.01); *F17C 2221/012* (2013.01)

(56) References Cited

U.S. PATENT DOCUMENTS

| | | | |
|---|---|---|---|
| 2004/0045970 A1* | 3/2004 | Debecker | F17C 1/06 |
| | | | 220/586 |
| 2018/0238496 A1 | 8/2018 | Otsubo | |
| 2018/0299074 A1 | 10/2018 | Iwano et al. | |
| 2021/0197499 A1* | 7/2021 | Katano | B29C 70/28 |

FOREIGN PATENT DOCUMENTS

| | | | | |
|---|---|---|---|---|
| JP | 2018-135970 A | 8/2018 | | |
| JP | 2018-179201 A | 11/2018 | | |
| WO | WO-9728401 A1 * | 8/1997 | | B21D 51/24 |
| WO | WO-0157429 A1 * | 8/2001 | | F16J 12/00 |
| WO | WO-2009100085 A2 * | 8/2009 | | F17C 1/02 |

\* cited by examiner

METHOD OF PRODUCING HIGH-PRESSURE TANK, AND HIGH-PRESSURE TANK

CROSS-REFERENCE TO RELATED APPLICATION

This application claims priority to Japanese Patent Application No. 2020-046355 filed on Mar. 17, 2020 and Japanese Patent Application No. 2020-155018 filed on Sep. 15, 2020, each incorporated herein by reference in its entirety.

BACKGROUND

1. Technical Field

The disclosure relates to a high-pressure tank including a liner that contains gas, and a reinforcement layer that is made of fiber-reinforced resin and covers an outer surface of the liner, and also relates to a method of producing the high-pressure tank.

2. Description of Related Art

As a high-pressure tank used for storage and supply of hydrogen, for example, there is known a tank including a tank main body, and a cap or caps attached to an open, longitudinal end portion or portions of the tank main body. The tank main body includes a liner that airtightly holds hydrogen gas, and a reinforcement layer that is reinforced with fiber bundles impregnated with resin, such that the fiber bundles are wound around an outer surface of the liner.

One example of the high-pressure tank including the liner, reinforcement layer that covers the outer surface of the liner, and caps provided at end portions of the reinforcement layer is described in Japanese Unexamined Patent Application Publication No. 2018-179201 (JP 2018-179201 A). The high-pressure tank described in JP 2018-179201 A includes a liner, a reinforcement layer that is made of fiber-reinforced resin and covers an outer surface of the liner, and caps provided at end portions of the reinforcement layer. Each of the caps has a cylindrical protruding portion having a gas channel used for filling and discharge of hydrogen gas, for example.

SUMMARY

In the meantime, in an attempt to reduce the weight of the high-pressure tank, from the standpoint of transportation of the high-pressure tank, and improvement in the fuel economy of a vehicle on which the high-pressure tank is installed, it may be considered to form a portion corresponding to the cap, of fiber-reinforced resin, for reduction of the weight.

In this case, it may be considered to wind fiber bundles impregnated with resin, around the outer surface of the liner, or the like, provided with a cylindrical protruding portion having a gas passage, by filament winding, so as to form a reinforcement layer having a portion corresponding to the cap. However, when the pressure within the high-pressure tank becomes considerably high, large force is applied outward in the axial direction to a valve attached to a distal end of the protruding portion, and large force is also applied outward in the axial direction to the protruding portion itself. At this time, it is difficult to ensure sufficient tensile strength in the axial direction of the protruding portion, since the fiber bundles are spirally wound on the protruding portion. Thus, the protruding portion may be damaged.

This disclosure provides a high-pressure tank and a method of producing the high-pressure tank, which can curb damage of a protruding portion having a gas channel, while achieving reduction of the weight of the high-pressure tank.

A method of producing a high-pressure tank according to a first aspect of the disclosure is that of producing a high-pressure tank including a liner that contains gas, and a reinforcement layer that is made of fiber-reinforced resin and covers an outer surface of the liner. The reinforcement layer has a cylindrical member, and two domed members provided at opposite ends of the cylindrical member and formed integrally with the cylindrical member, and one of the domed members includes a domed main body, and a cylindrical protruding portion that protrudes from the domed main body and has a gas channel used for filling and discharge of the gas. The method includes a process of forming at least the one of the domed members, and the process of forming at least the one of the domed members includes a step of placing first fiber bundles impregnated with a first resin, such that the first fiber bundles form a part of the protruding portion and a part of the domed main body, and a step of placing second fiber bundles impregnated with a second resin, such that the second fiber bundles cover the first fiber bundles. The first fiber bundles are placed, such that a fiber direction of the first fiber bundles in the protruding portion follows an axial direction of the protruding portion, and the first fiber bundles extend continuously from the protruding portion to the domed main body, and the first resin with which the first fiber bundles are impregnated is solidified while the first fiber bundles are being placed. The second fiber bundles are placed, such that a fiber direction of the second fiber bundles intersects with the fiber direction of the first fiber bundles.

According to the method of producing the high-pressure tank of the disclosure, the first fiber bundles are placed such that the fiber direction in the protruding portion follows the axial direction of the protruding portion. As a result, sufficient tensile strength as measured in the axial direction of the protruding portion can be secured. Also, the first fiber bundles are arranged to extend continuously from the protruding portion to the domed main body, and the second fiber bundles are placed so as to cover the first fiber bundles. Thus, the second fiber bundles restrain movement of the first fiber bundles, and the protruding portion can be prevented from being pulled out of the domed main body. Also, the second fiber bundles are provided such that the fiber direction of the second fiber bundles intersects with the fiber direction of the first fiber bundles. Thus, not only the tensile strength in the axial direction, but also the tensile strength in other directions, such as radial directions, can be secured. Accordingly, even when the pressure within the high-pressure tank becomes high, and large force is applied outward in the axial direction to the protruding portion, the protruding portion is less likely or unlikely to be damaged. Thus, there is no need to provide a cap, and the weight of the high-pressure tank can be reduced.

In the method of producing the high-pressure tank according to the first aspect, the first resin may be thermoplastic resin, and the second resin may be thermosetting resin. While the first fiber bundles are placed in a condition where the first resin is softened, the first resin with which the first fiber bundles are impregnated may be solidified. The second fiber bundles may be are placed in a condition where the second resin is uncured, and then the second resin may be heated and cured. With the first resin with which the first fiber bundles are impregnated being thermoplastic resin, when the first fiber bundles are placed on a surface of a mandrel or liner, for example, in a condition where the first resin is softened, heat of the first fiber bundles is removed by the mandrel or liner, and the resin with which the first fiber bundles are impregnated is solidified. Then, the second fiber bundles are placed on the first fiber bundles in the condition where the first resin is solidified. Thus, since the first fiber bundles are not deflected or displaced when the second fiber bundles are placed on the first fiber bundles, the tensile strength of the protruding portion in the axial direction is less likely or unlikely to be reduced. Also, with the second resin with which the second fiber bundles are impregnated being thermosetting resin, the mechanical strength of the protruding portion after the second resin is cured can be easily improved.

In the method of producing the high-pressure tank according to the first aspect, when the two domed members are formed, surfaces of the domed members which contact with the gas may be formed by the first fiber bundles. The thermoplastic resin has gas barrier properties; therefore, when the surfaces of the domed members which contact with the gas are formed by the first fiber bundles impregnated with the thermoplastic resin, there is no need to provide a liner (its dome-like opposite end portions) along the inner surfaces of the domed members. As a result, the weight of the high-pressure tank can be further reduced.

A high-pressure tank according to a second aspect of the disclosure includes a liner configured to contain gas, and a reinforcement layer made of fiber-reinforced resin and configured to cover an outer surface of the liner. The reinforcement layer has a cylindrical member, and two domed members provided at opposite ends of the cylindrical member and formed integrally with the cylindrical member. One of the domed members includes a domed main body, and a protruding portion that protrudes from the domed main body, and has a gas channel used for filling and discharge of the gas. The domed main body and the protruding portion are formed by first fiber bundles impregnated with a first resin and second fiber bundles impregnated with a second resin. The first fiber bundles constitute a part of the protruding portion and a part of the domed main body, and are placed continuously from the protruding portion to the domed main body, such that a fiber direction of the first fiber bundles in the protruding portion follows an axial direction of the protruding portion. The second fiber bundles cover the first fiber bundles, and are placed such that a fiber direction of the second fiber bundles intersects with the fiber direction of the first fiber bundles.

In the high-pressure tank according to the second aspect of the disclosure, the first fiber bundles are placed such that the fiber direction in the protruding portion follows the axial direction of the protruding portion. As a result, sufficient tensile strength as measured in the axial direction of the protruding portion can be secured. Also, the first fiber bundles are arranged to extend continuously from the protruding portion to the domed main body, and the second fiber bundles are placed so as to cover the first fiber bundles. Thus, the second fiber bundles restrain movement of the first fiber bundles, and the protruding portion can be prevented from being pulled out of the domed main body. Also, the second fiber bundles are provided such that the fiber direction of the second fiber bundles intersects with the fiber direction of the first fiber bundles. Thus, not only the tensile strength in the axial direction, but also the tensile strength in other directions, such as radial directions, can be secured. Accordingly, even when the pressure within the high-pressure tank becomes high, and large force is applied outward in the axial direction to the protruding portion, the protruding portion is less likely or unlikely to be damaged. Thus, there is no need to provide a cap, and the weight of the high-pressure tank can be reduced.

In the high-pressure tank according to the second aspect, the first resin may be thermoplastic resin, while the second resin may be thermosetting resin, and surfaces of the domed members which contact with the gas may be formed by the first fiber bundles. The thermoplastic resin has gas barrier properties; therefore, when the surfaces of the domed members which contact with the gas are formed by the first fiber bundles impregnated with the thermoplastic resin, there is no need to provide a liner (its domed portions) along the inner surfaces of the domed members. As a result, the weight of the high-pressure tank can be further reduced. Also, with the second resin with which the second fiber bundles are impregnated being thermosetting resin, the mechanical strength of the protruding portion can be easily improved.

In the method of producing the high-pressure tank according to the first aspect, the first fiber bundles may be placed on an outer periphery of an insert that is placed inside the protruding portion and has a female thread on an inner circumferential surface. Thus, the insert can be placed inside the protruding portion of the domed member, and a valve having a male thread on its outer circumferential surface can be screwed into the female thread on the inner circumferential surface of the insert, so that the valve can be attached to the protruding portion. With this arrangement, even when the pressure within the high-pressure tank is applied to the valve, and the tensile force is applied outward in the axial direction of the high-pressure tank to the protruding portion, stress concentration on a particular portion or portions can be avoided, and the liner can be prevented from being damaged. In this connection, the first fiber bundles may be placed on the outer periphery of the second fiber bundles placed on the outer periphery of the insert, and the second fiber bundles are further placed on the outer periphery of the first fiber bundles, so that an intermediate layer of the first fiber bundles is placed between the second fiber bundles. In this case, the opposite surfaces of the first fiber bundles may be bonded to the second fiber bundles.

In the high-pressure tank according to the second aspect, a cylindrical insert may be placed inside the protruding portion, and the insert may have a female thread on an inner circumferential surface. Thus, a valve having a male thread on its outer circumferential surface can be screwed into the female thread on the inner circumferential surface of the insert, so that the valve can be attached to the protruding portion. With this arrangement, even when the pressure within the high-pressure tank is applied to the valve, and the tensile force is applied outward in the axial direction of the high-pressure tank to the protruding portion, stress concentration on a particular portion or portions can be avoided, and the liner can be prevented from being damaged.

According to the disclosure, it is possible to provide the high-pressure tank and its production method, which can curb damage of the protruding portion having the gas channel, while achieving reduction of the weight of the high-pressure tank.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
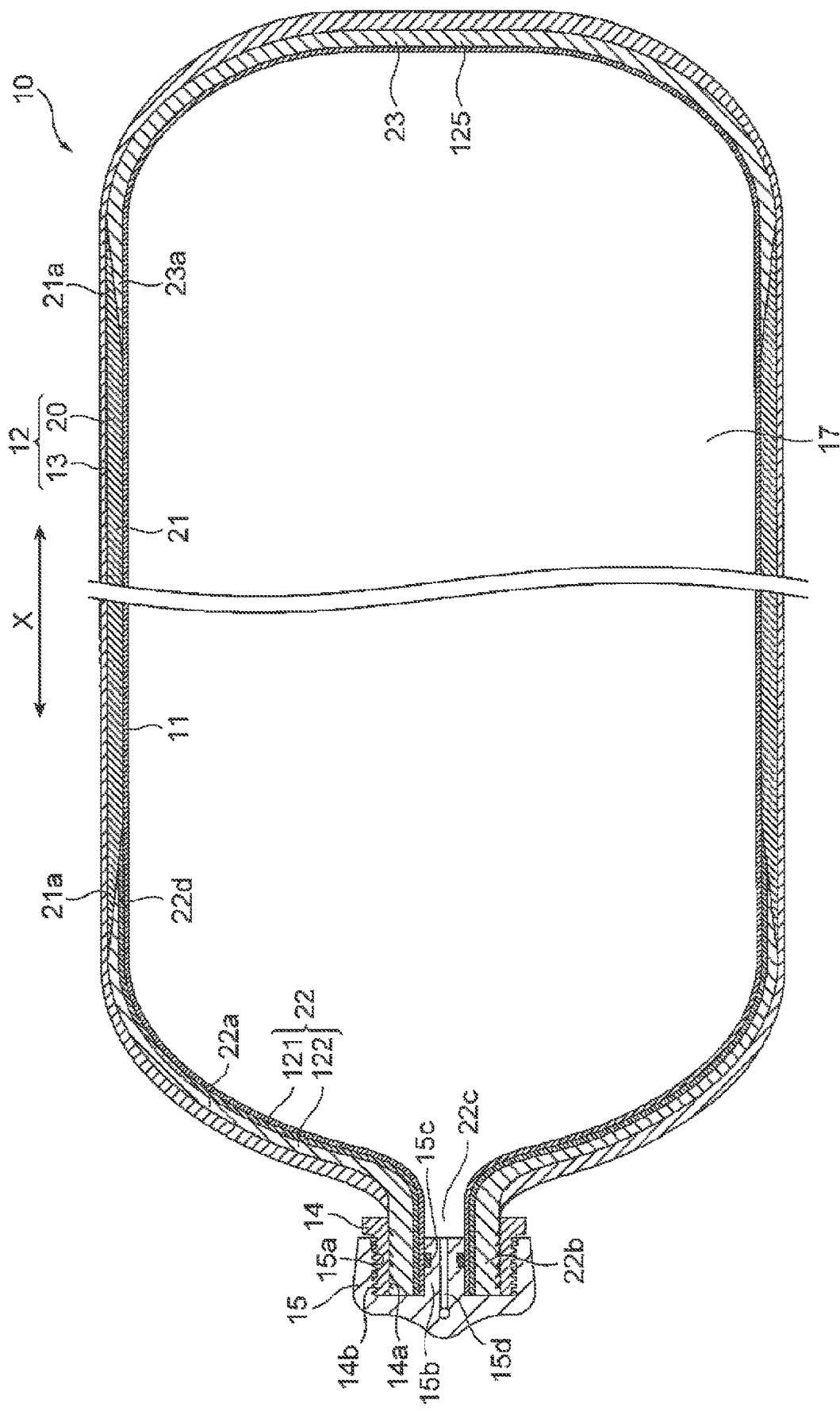
FIG. 1 is a cross-sectional view showing the structure of a high-pressure tank according to a first embodiment of the disclosure.

The configuration of a high-pressure tank 10 will be briefly described, before a method of producing the high-pressure tank 10 according to a first embodiment of the disclosure is described, referring to the drawings. While the high-pressure tank 10 will be described as a tank installed on a fuel cell vehicle and filled with high-pressure hydrogen gas, the tank 10 may find other applications or uses. Also, the gas with which the high-pressure tank 10 can be filled is not limited to the high-pressure hydrogen gas.

As shown in FIG. 1, the high-pressure tank 10 is a generally cylindrical, high-pressure gas storage container that is rounded like a dome at its opposite ends. The high-pressure tank 10 includes a liner 11 having gas barrier properties, and a fiber-reinforced resin layer 12 that is made of fiber-reinforced resin and covers an outer surface of the liner 11. The fiber-reinforced resin layer 12 has a reinforcement body 20 as a reinforcement layer that covers the outer surface of the liner 11, and an outer reinforcement layer 13 that covers an outer surface of the reinforcement body 20. An opening is formed at one end of the high-pressure tank 10. In the high-pressure tank 10 of this embodiment, no cap is provided. Also, no opening is formed at the other end of the high-pressure tank 10.

The liner 11 is formed along an inner surface of the reinforcement body 20. The liner 11 is made of resin, and forms a housing space 17 filled with high-pressure hydrogen gas. It is preferable that the resin that forms the liner 11 is capable of holding the filling gas (hydrogen gas in this embodiment) in the housing space 17, namely, the resin has good gas barrier properties. Examples of the resin include thermoplastic resins, such as polyamide, polyethylene, ethylene-vinylalcohol copolymer resin (EVOH), and polyester, and thermosetting resins, such as epoxy. The gas with which the housing space 17 defined by the liner 11 is filled is not limited to the hydrogen gas serving as fuel gas, but may be selected from various compressed gases, such as compressed natural gas (CNG), various liquefied gases, such as liquefied natural gas (LNG), and liquefied petroleum gas (LPG), and other gases.

The reinforcement body 20 covers the outer surface of the liner 11, and also functions to reinforce the liner 11 and improve the mechanical strength, such as rigidity and pressure resistance, of the high-pressure tank 10. The reinforcement body 20 has a cylindrical member 21, and two domed members 22, 23 connected to opposite ends of the cylindrical member 21, as will be described later, and the cylindrical member 21 and domed members 22, 23 are integrally formed to provide a layer. In this embodiment, the domed member 22 consists of a first resin layer 121, and a second resin layer 122 formed to cover the first resin layer 121, and the domed member 23 consists of a third resin layer 125.

In this embodiment, the domed member 22 includes a domed main body 22a, and a cylindrical protruding portion 22b that protrudes from the domed main body 22a. The protruding portion 22b has a gas channel 22c used for filling and discharge of hydrogen gas, for example. A valve fixture 14 made of metal is fixed to an outer circumferential surface of the protruding portion 22b, and a valve 15 made of metal and used for charging and discharging hydrogen gas into and from the housing space 17 is attached to an outer circumferential surface of the valve fixture 14. Retaining projections 14a are formed on an inner surface of the valve fixture 14, and a thread 14b to which the valve 15 is attached is formed on an outer surface of the valve fixture 14. Then, the valve fixture 14 is fixed by caulking to the outer circumferential surface of the protruding portion 22b. A thread 15a that engages with the thread 14b of the valve fixture 14 is formed on an inner surface of the valve 15, and the valve 15 is fixed to an end portion of the protruding portion 22b via the valve fixture 14. Also, the valve 15 is formed with an inserted portion 15b that is inserted in the protruding portion 22b. The inserted portion 15b is provided with a seal member 15c that seals the housing space 17, and is formed with a passage 15d through which hydrogen gas passes.

The first resin layer 121 is formed by fiber bundles F1 (first fiber bundles) impregnated with first resin that is thermoplastic resin. The first resin layer 121 forms a part of the domed main body 22a and a part of the protruding portion 22b, and is positioned such that fibers extend continuously from the protruding portion 22b to the domed main body 22a. In this embodiment, the first resin layer 121 is positioned such that the fibers extend continuously from the protruding portion 22b to a peripheral edge portion of domed main body 22a. Also, the first resin layer 121 is formed such that the fiber direction in the protruding portion 22b follows the axial direction X of the protruding portion 22b (is parallel to the axial direction X in this embodiment). The specific fiber direction in the protruding portion 22b of the first resin layer 121 will be described later.

The second resin layer 122 is formed by fiber bundles F2 (second fiber bundles) impregnated with second resin that is thermosetting resin. The second resin layer 122 is formed to cover the first resin layer 121. Also, the second resin layer 122 is formed such that the fiber direction of the second resin layer 122 intersects with the fiber direction of the first resin layer 121.

The outer reinforcement layer 13 is formed to cover the outer surface of the reinforcement body 20. The outer reinforcement layer 13 covers the whole of the domed members 22, 23. The outer reinforcement layer 13 is formed of resin and fibers (continuous fibers). In the outer reinforcement layer 13, the fibers are oriented so as to be in parallel with the axial direction of the cylindrical member 21, or to be inclined 45 degrees or less with respect to the axial direction of the cylindrical member 21, and are also positioned over the two domed members 22, 23 via the cylindrical member 21. The fibers prevent the domed members 22, 23 from moving outward in the axial direction X, and prevent the domed members 22, 23 from being separated from the cylindrical member 21 outward in the axial direction X due to a gas pressure.

Figure 2:
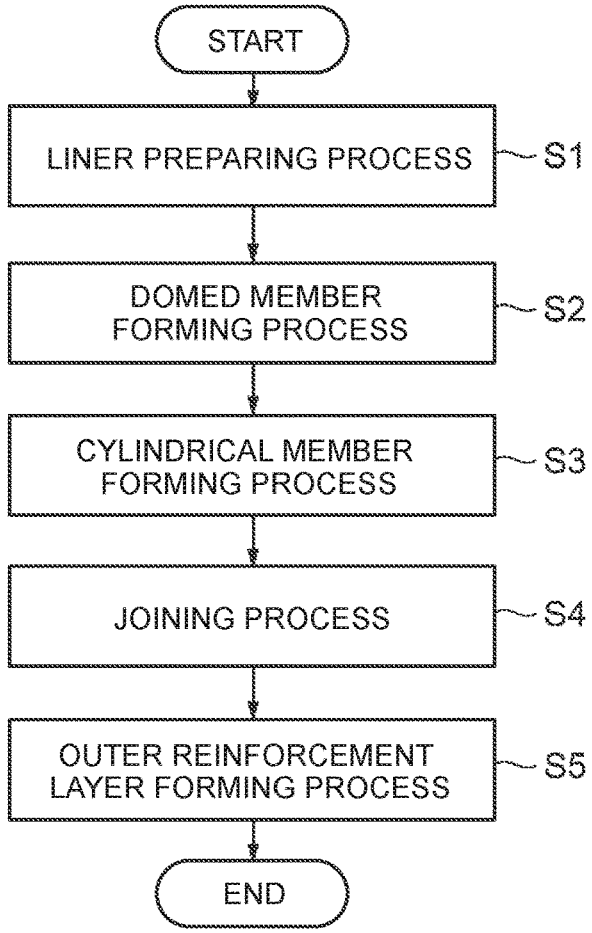
FIG. 2 is a flowchart illustrating a method of producing the high-pressure tank according to the first embodiment of the disclosure.

Next, the method of producing the high-pressure tank 10 according to the first embodiment of the disclosure will be described. FIG. 2 is a flowchart illustrating the method of producing the high-pressure tank 10. As shown in FIG. 2, the method of producing the high-pressure tank 10 includes a liner preparing process S1, domed member forming process S2, cylindrical member forming process S3, joining process S4, and outer reinforcement layer forming process S5. While the liner preparing process S1, domed member forming process S2, and cylindrical member forming process S3 are described as being conducted in this order in FIG. 2, the liner preparing process S1, domed member forming process S2, and cylindrical member forming process S3, which are independent of each other, may be conducted in parallel, or any of the processes may be conducted first.

In the liner preparing process S1, the liner 11 as shown in FIG. 1 is prepared. The liner 11 has a cylindrical portion and domed portions at opposite ends of the cylindrical portion, and is formed at one of the domed portions with a cylindrical protruding portion having a gas channel that connects the inside with the outside of the liner 11. The method of producing the liner 11 is not limited to any particular method, but the liner 11 may be produced using a known technology.

Figure 3:
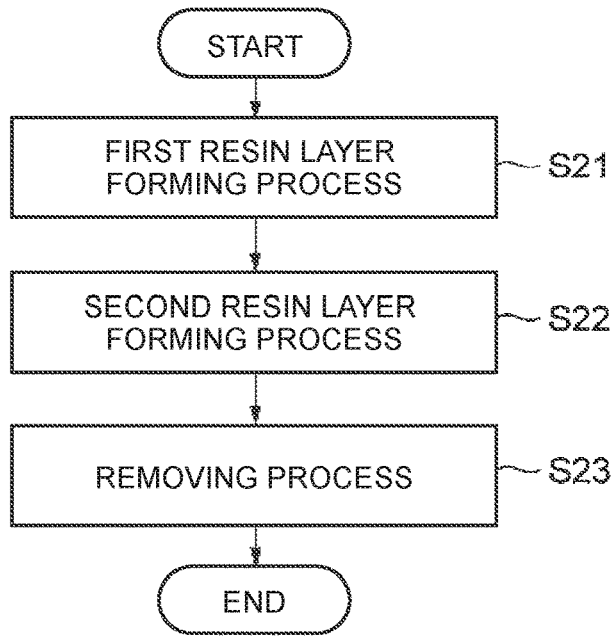
FIG. 3 is a flowchart illustrating a domed member forming process of the method of producing the high-pressure tank according to the first embodiment of the disclosure.

The domed member forming process S2 includes a first resin layer forming process S21, second resin layer forming process S22, and removing process S23, as shown in FIG. 3. While the first resin layer forming process S21, second resin layer forming process S22, and removing process S23 are conducted for forming the domed member 22, these processes may also be conducted for forming the domed member 23 at the same time. Also, the domed member 22 and the domed member 23 may be formed by separate processes. Here, the method of forming the domed member 22 and the domed member 23 by separate processes will be described, and then, the method of forming the domed member 22 and the domed member 23 at the same time will be described.

Figure 4:
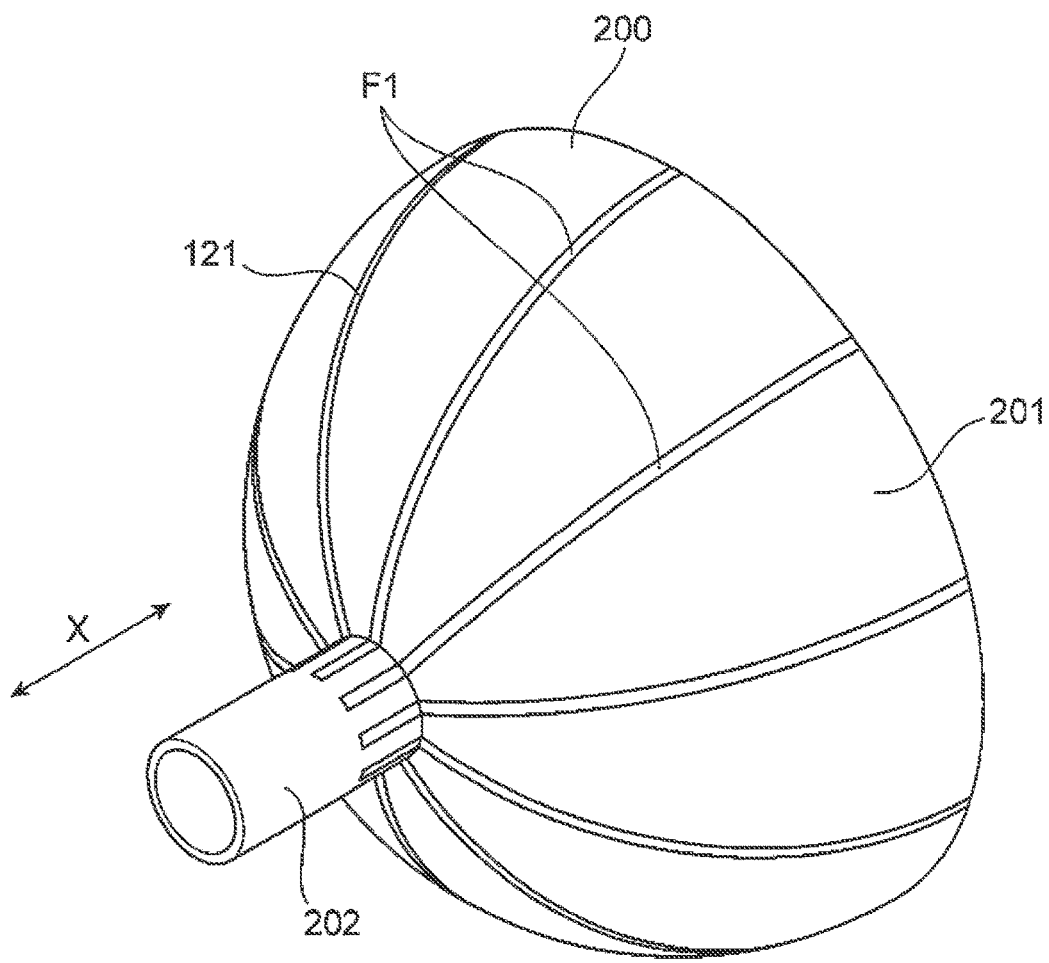
FIG. 4 is a perspective view useful for describing the domed member forming process of the method of producing the high-pressure tank according to the first embodiment of the disclosure.
Figure 5:
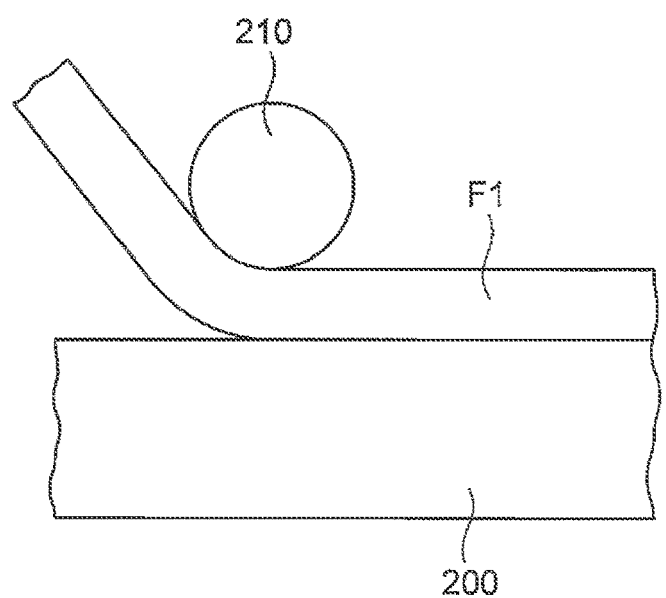
FIG. 5 is a cross-sectional view useful for describing the domed member forming process of the method of producing the high-pressure tank according to the first embodiment of the disclosure.

In the first resin layer forming process S21, the first resin layer 121 is formed on an outer surface of a mandrel 200, as shown in FIG. 4. More specifically, the mandrel 200 has a dome-like main body 201, and a shaft portion 202 that extends outward from the main body 201. Then, the fiber bundles F1 impregnated with the thermoplastic resin are attached under pressure to the outer surface of the mandrel 200, with a pressure roller 210, using a tape placement process as shown in FIG. 5 by way of example. At this time, the fiber bundles F1 are attached to (placed on) the mandrel 200, in a condition where the resin with which the fiber bundles F1 are impregnated is heated and softened, using a laser device (not shown). The mandrel 200 deprives heat of the resin with which the attached fiber bundles F1 are impregnated, and the resin is quickly solidified. Thus, with the use of the fiber bundles F1 impregnated with the thermoplastic resin, the resin with which the attached fiber bundles F1 are impregnated cam be quickly solidified, so that the fiber bundles F1 can be attached to the mandrel 200 while tensile force is applied to the fiber bundles F1. As a result, the fiber bundles F1 are arranged in substantially the same fiber direction, and the tensile strength of the first resin layer 121 can be made less likely or unlikely to be reduced. Also, the fiber bundles F1 may be subjected to cooling wind, so that the thermoplastic resin with which the fiber bundles F1 are impregnated is more quickly solidified. While the material of the mandrel 200 is not limited to any particular material, the mandrel 200 is preferably made of metal, to ensure sufficient strength with which it is not deformed when the fiber bundles F1 and fiber bundles F2 which will be described later are placed on it.

Here, the fiber bundles F1 are arranged to extend continuously from the main body 201 of the mandrel 200 to the shaft portion 202. In this embodiment, the fiber bundles F1 are arranged to extend continuously from a peripheral edge portion of the main body 201 to the shaft portion 202. Also, the fiber bundles F1 are arranged such that the fiber direction in the shaft portion 202 follows (in this embodiment, is in parallel with) the axial direction X of the shaft portion 202. Also, the fiber bundles F1 are arranged at given angular intervals in the circumferential direction of the mandrel 200. In this manner, the first resin layer 121 of the domed member 22 is formed, so as to spread radially (in radial directions) from the shaft portion 202 of the mandrel 200.

In the second resin layer forming process S22, the second resin layer 122 (see FIG. 7) is formed on the outer surface of the mandrel 200, so as to cover the first resin layer 121 (namely, the fiber bundles F1 impregnated with the first resin) from the state shown in FIG. 4. A state in which the second resin layer 122 is formed so as to cover the first resin layer 121 from the state shown in FIG. 4 is substantially identical with a part of the state shown in FIG. 7 which will be described later; thus, the state is not illustrated in the drawings. When the second resin layer 122 is formed, the fiber bundles F2 impregnated with uncured second resin that is thermosetting resin may be attached under pressure to the mandrel 200 so as to cover the outer surface of the mandrel 200, by means of the pressure roller 210, using the tape placement process, as in the case where the first resin layer 121 is formed, for example. At this time, the fiber bundles F2 are arranged such that the fiber direction of the fiber bundles F2 intersects with the fiber direction of the fiber bundles F1.

Then, the second resin layer 122 (i.e., the uncured, thermosetting resin with which the fiber bundles F2 are impregnated) is heated and cured. Preferably, the curing temperature of the thermosetting resin of the second resin layer 122 is set to a lower level than the softening temperature of the thermoplastic resin of the first resin layer 121. The curing temperature of the thermosetting resin of the second resin layer 122 changes, through adjustment of the amount and type of a curing agent contained in the thermosetting resin of the second resin layer 122, for example; therefore, the curing temperature of the thermosetting resin of the second resin layer 122 can be easily set to a lower level than the softening temperature of the thermoplastic resin of the first resin layer 121. With this arrangement, the first resin of the first resin layer 121 can be prevented from being softened when the second resin layer 122 is cured, and the fibers contained in the first resin layer 121 can be prevented from being deflected or displaced.

In the removing process S23, the first resin layer 121 and the second resin layer 122 are removed from the mandrel 200. As a result, the domed member 22 is formed. Thus, the second resin layer 122 is removed from the mandrel 200, after the second resin layer 122 is heated and cured, so that deformation of the second resin layer 122 can be curbed.

When the domed member 23 is formed by a process separate from the process of forming the domed member 22, the third resin layer 125 is formed on the outer surface of the main body 201 of the mandrel 200 that does not have the shaft portion 202, for example. At this time, like the second resin layer 122, the third resin layer 125 may be formed by attaching fiber bundles impregnated with third resin that is thermosetting resin, to the mandrel 200, using the tape placement process. Then, the third resin layer 125 is heated and cured. Thereafter, the third resin layer 125 is removed from the mandrel 200, so that the domed member 23 is formed.

While the thermoplastic resin contained in the first resin layer 121 is not limited to any particular material, polyetheretherketone, polyphenylene sulfide, polyacrylic acid ester, polyimide, polyamide, etc., may be used as the thermoplastic resin.

While the thermosetting resin contained in the second resin layer 122 and the third resin layer 125 is not limited to any particular material, thermosetting resin, such as phenol resin, melamine resin, urea resin, or epoxy resin, is preferably used. In particular, epoxy resin is preferably used in terms of the mechanical strength, etc. Generally, the epoxy resin is obtained by mixing prepolymer, such as a copolymer of bisphenol A and epichlorohydrin, with a curing agent, such as polyamine, and thermally curing the mixture. The epoxy resin has fluidity in an uncured state, and forms a strong cross-linked structure after it is thermally cured.

As the fibers contained in the first resin layer 121, second resin layer 122, and third resin layer 125, glass fibers, aramid fibers, boron fibers, carbon fibers, and so forth, may be used. In particular, carbon fibers are preferably used in terms of the light weight, mechanical strength, etc.

Next, the case where the domed member 23 is formed at the same time as (in the same process as) the domed member 22 will be described. In this method, the third resin layer 125 is formed by the fiber bundles F2.

Figure 6:
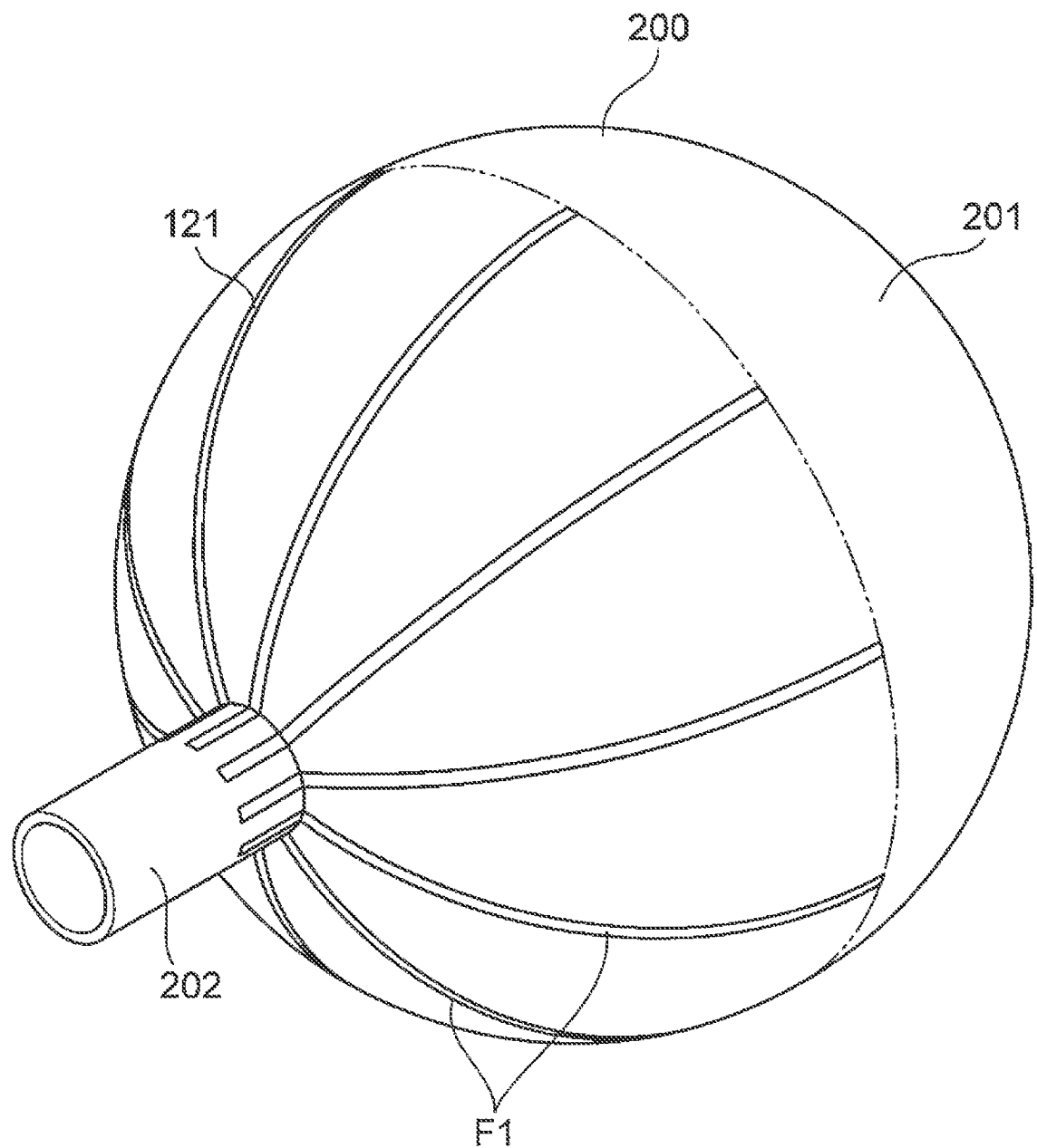
FIG. 6 is a perspective view useful for describing a modified example of the domed member forming process of the method of producing the high-pressure tank according to the first embodiment of the disclosure.

In the first resin layer forming process S21, the mandrel 200 as shown in FIG. 6 is used. In the mandrel 200, the main body 201 is formed in a generally spherical shape. The first resin layer 121 is formed in the manner as described above, on the outer surface of the mandrel 200.

Figure 7:
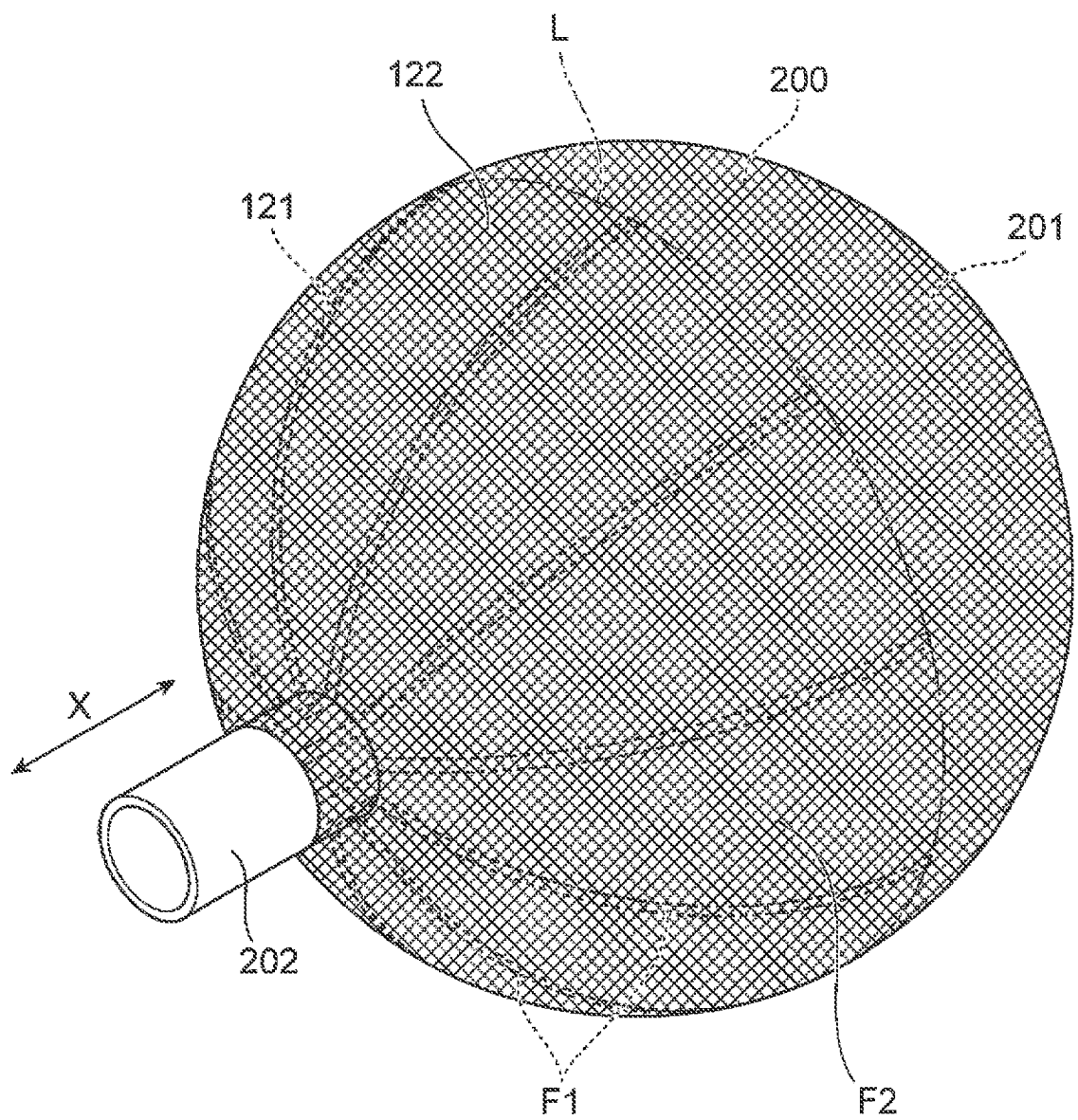
FIG. 7 is a perspective view useful for describing the modified example of the domed member forming process of the method of producing the high-pressure tank according to the first embodiment of the disclosure.

In the second resin layer forming process S22, the second resin layer 122 is formed on the outer surface of the mandrel 200, so as to cover the first resin layer 121, as shown in FIG. 7. At this time, the second resin layer 122 may be formed by attaching the fiber bundles F2 to the mandrel 200, using the above tape placement process. However, the second resin layer 122 may be formed by winding the fiber bundles F2 over the mandrel 200, using a filament winding process (FM process), for example. More specifically, the shaft portion 202 of the mandrel 200 is attached to a rotating mechanism (not shown). Then, with the mandrel 200 being rotated, the fiber bundles F2 are wound, so as to cover the first resin layer 121 and the outer surface of the mandrel 200. At this time, the fiber bundles F2 are wound at an angle inclined 40 degrees or larger, for example, with respect to the axial direction X of the shaft portion 202. Then, the thermosetting resin with which the fiber bundles F2 are impregnated is heated and cured.

In the removing process S23, the winding (fiber bundles F2) placed over the outer surface of the mandrel 200 is split along a two-dot chain line L of FIG. 7 into two pieces, using a cutter (not shown). Then, the pieces into which the winding is split are separated from the mandrel 200, to form the two domed members 22, 23.

In this embodiment, after the removing process S23, the valve fixture 14 is fixed by caulking to the protruding portion 22b. However, the valve fixture 14 may be fixed to the protruding portion 22b before the domed member 22 is removed from the mandrel 200. Also, the valve fixture 14 may be fixed to the protruding portion 22b before the second resin layer 122 is heated and cured. In this case, the valve fixture 14 can be firmly fixed to the protruding portion 22b.

Figure 8:
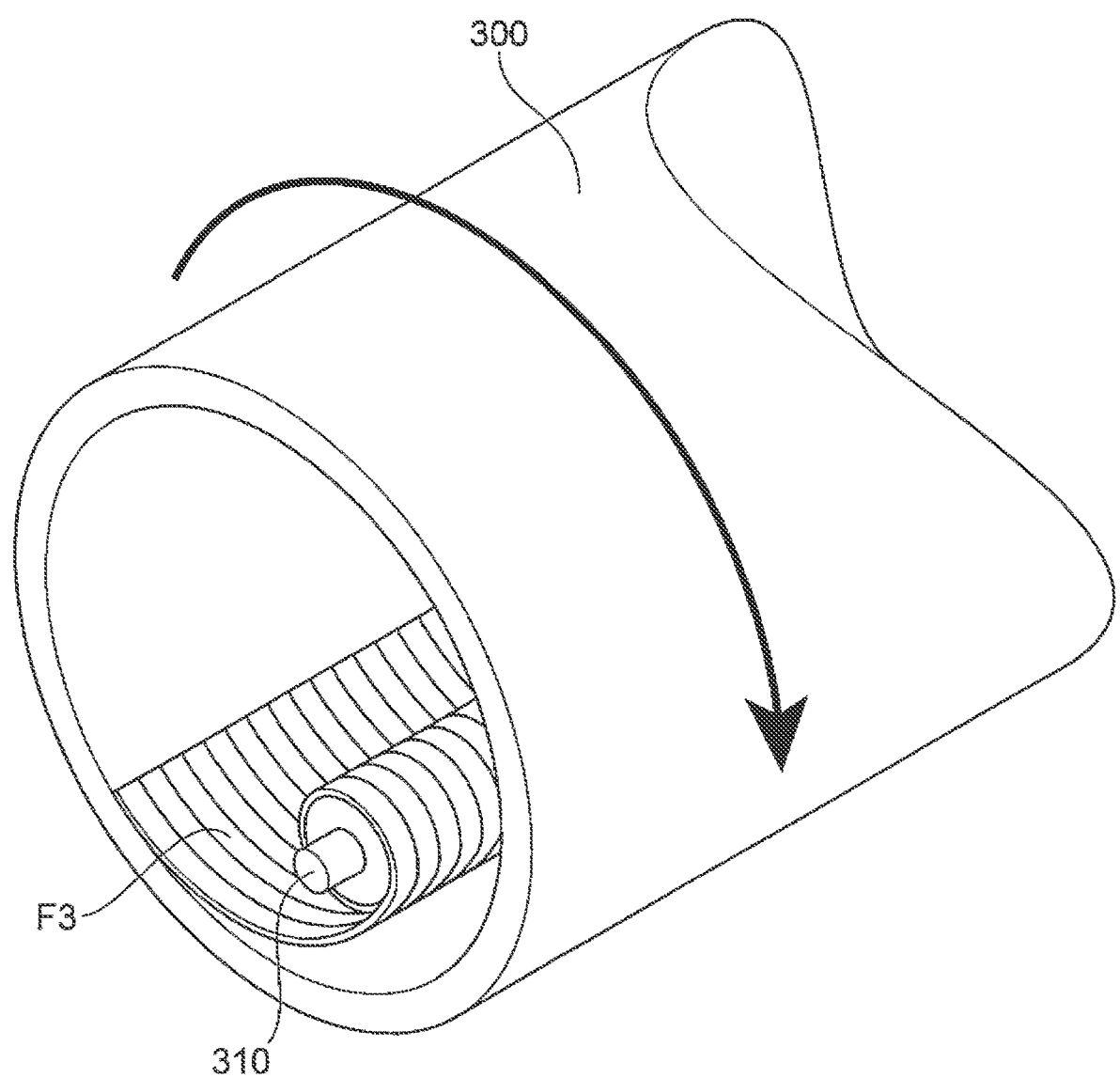
FIG. 8 is a perspective view useful for describing a cylindrical member forming process of the method of producing the high-pressure tank according to the first embodiment of the disclosure.

In the cylindrical member forming process S3, a fiber sheet F3 is attached to an inner surface of a rotating cylindrical mandrel 300, to form the cylindrical member 21 by a so-called centrifugal winding (CW) process, for example, as shown in FIG. 8. More specifically, the cylindrical mandrel 300 is rotated at a given rotational speed by a rotating mechanism (not shown).

In the cylindrical mandrel 300, an unwinding roller 310 of an unwinding device (not shown) is provided for unwinding the fiber sheet F3 in the form of a roll. The fiber sheet F3 is unwound while the cylindrical mandrel 300 is being rotated, so that the fiber sheet F3 is attached to the inner surface of the cylindrical mandrel 300, to form the cylindrical member 21.

The fiber sheet F3 has at least fibers oriented in the circumferential direction of the unwinding roller 310. Thus, the cylindrical member 21 in which the fibers are oriented in the circumferential direction can be obtained.

To form the fiber sheet F3, a so-called UD (Uni-Direction) sheet into which a plurality of fiber bundles arranged in a single direction is woven with binding threads, or a fiber sheet in which a plurality of fiber bundles arranged in a single direction is woven with a plurality of fiber bundles that intersects with the above fiber bundles, for example, at right angles to each other, may be impregnated with resin in advance, and used.

The third resin with which the fiber sheet F3 is impregnated is not limited to any particular type of resin, but thermosetting resin may be used as the third resin, for example. As the third resin, thermosetting resin, such as phenol resin, melamine resin, urea resin, or epoxy resin, is preferably used, like the fiber bundles F2. In particular, epoxy resin is preferably used in view of the mechanical strength, etc.

As the fibers that form the fiber sheet F3, glass fibers, aramid fibers, boron fibers, carbon fibers, etc. may be used, like the fiber bundles F1 and F2. In particular, carbon fibers are preferably used in view of the light weight and mechanical strength, for example.

The cylindrical member 21 is formed on the inner surface of the cylindrical mandrel 300 such that its thickness is gradually reduced toward its opposite ends in the axial direction X, as shown in FIG. 1. Also, the domed members 22, 23 are formed such that the thickness is gradually reduced in the peripheral edge portions. Thus, in a condition where the cylindrical member 21 and the two domed members 22, 23 are combined together, a step is less likely or unlikely to be formed in connecting portions of the outer surface of the cylindrical member 21 and the outer surfaces of the two domed members 22, 23.

To gradually reduce the thickness of the cylindrical member 21 toward the opposite ends in the axial direction X, it is preferable to weave the fiber bundles into end portions of the fiber sheet F3 as viewed in the axial direction X (width direction) such that the thickness of the fiber bundles is gradually reduced. Also, the thickness may be gradually reduced by pressing the opposite ends of the cylindrical member 21 as viewed in the axial direction X, with a roller, or the like. To gradually reduce the thickness of the peripheral edge portions of the domed members 22, 23, the number of turns of the fiber bundle F2 and the winding direction may be adjusted, or the peripheral edge portions may be pressed with a roller, for example.

Then, after the cylindrical member 21 is heated and cured, the cylindrical member 21 is removed from the inside of the cylindrical mandrel 300. Thus, deformation of the cylindrical member 21 can be curbed when the cylindrical member 21 is removed from the cylindrical mandrel 300.

While the cylindrical member 21 is formed on the inner surface of the cylindrical mandrel 300 in the illustrated example, the cylindrical member 21 may be formed by other methods. For example, the cylindrical member 21 may be formed by attaching the fiber sheet F3 to an outer surface of a cylindrical mandrel, or by hoop-winding fiber bundles impregnated with the third resin, over an outer surface of a cylindrical mandrel, by the FW process.

The domed members 22, 23 are formed using the mandrel 200, and the cylindrical member 21 is formed using the cylindrical mandrel 300. Thus, the cylindrical member 21 and domed members 22, 23 are formed, without directly winding the fiber bundles, etc. over the liner 11. With this arrangement, no tightening force due to hoop winding or helical winding, for example, is applied to the liner 11, which eliminates the need to increase the strength of the liner 11, so as to prevent the liner 11 from being deformed due to the tightening force. Thus, the thickness of the liner 11 can be reduced, so that the volume of the liner 11 can be increased, and the weight of the liner 11 can be reduced.

Figure 9:
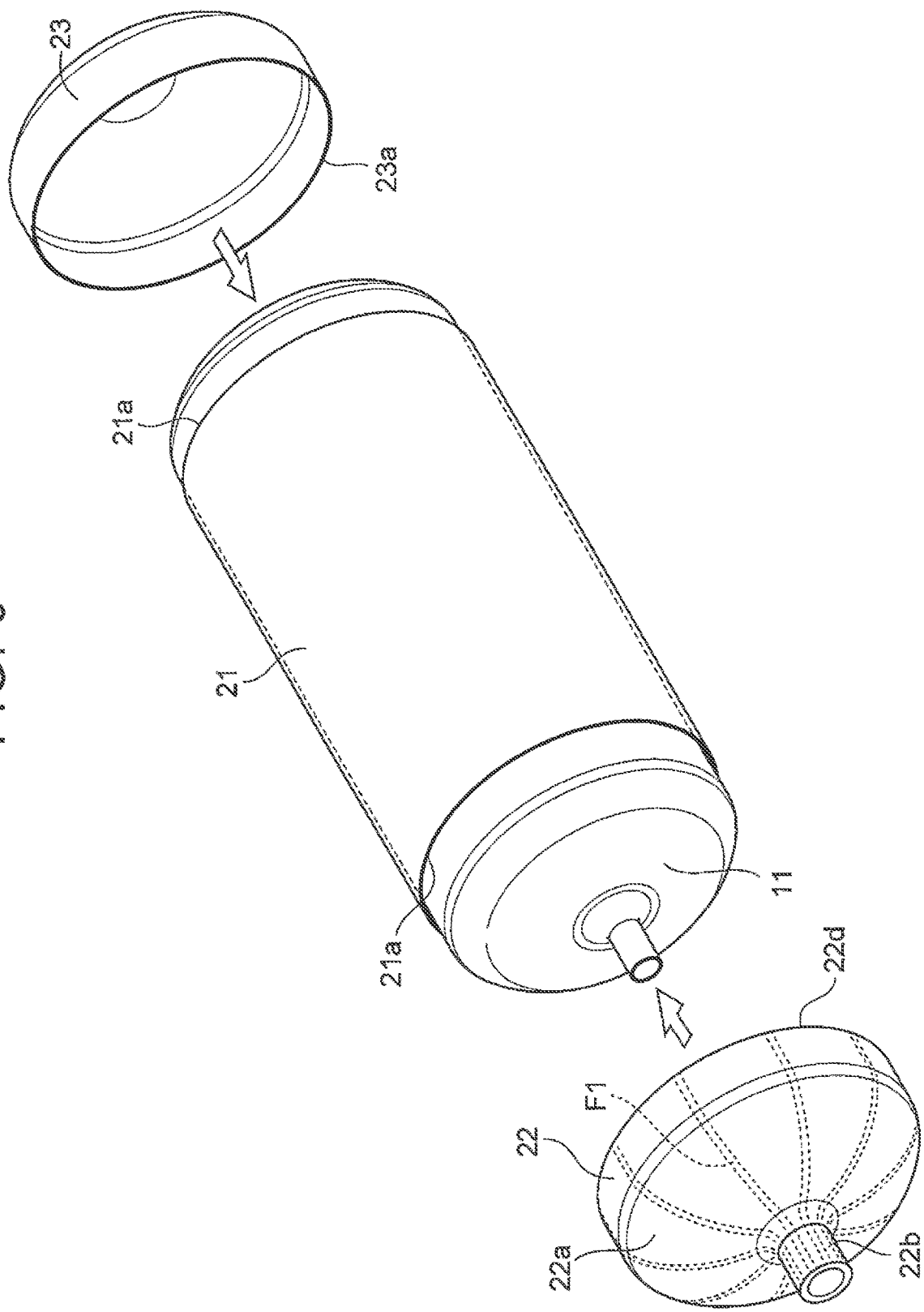
FIG. 9 is a perspective view useful for describing a joining process of the method of producing the high-pressure tank according to the first embodiment of the disclosure.
Figure 10:
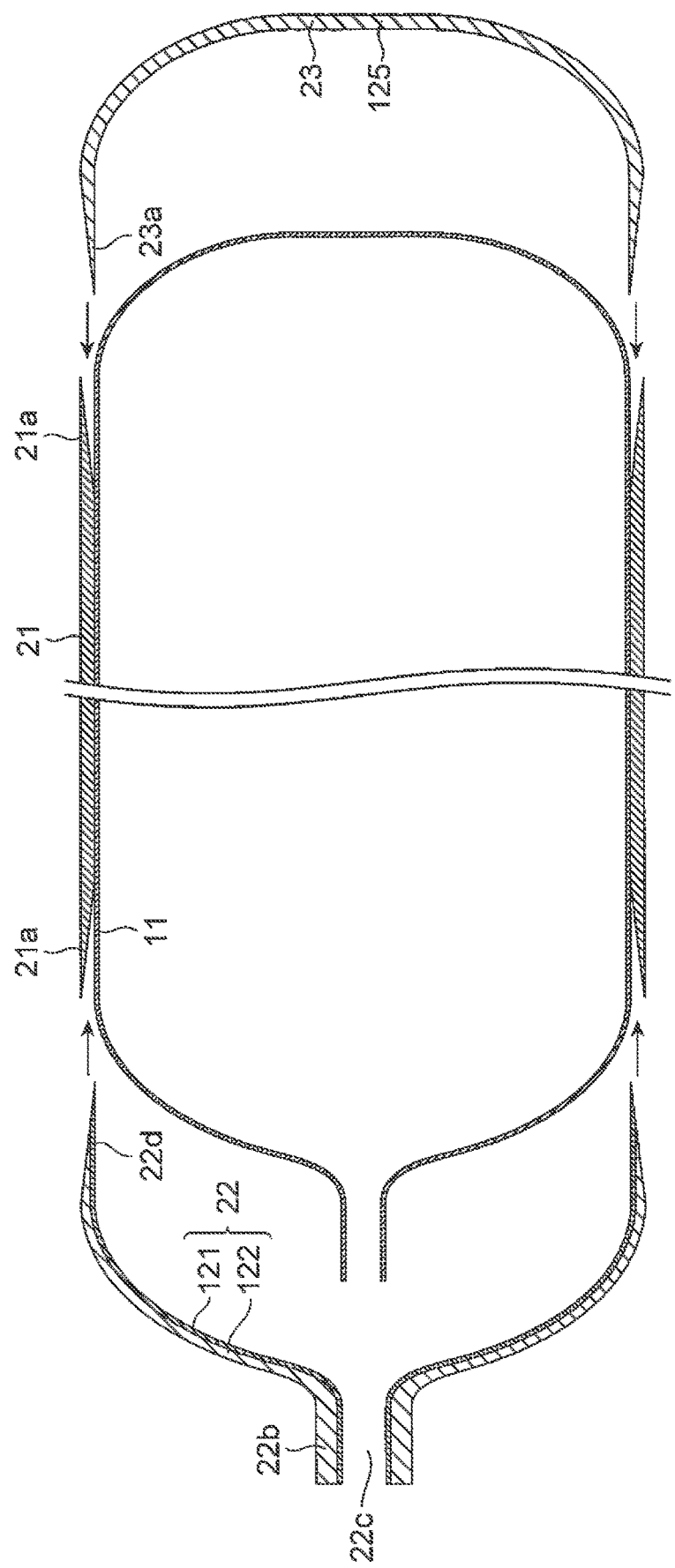
FIG. 10 is a cross-sectional view useful for describing the joining process of the method of producing the high-pressure tank according to the first embodiment of the disclosure.

In the joining process S4, peripheral edge portions 21a at the opposite ends of the cylindrical member 21 and peripheral edge portions 22d, 23a of the two domed members 22, 23 are joined to each other, as shown in FIG. 9 and FIG. 10, to form the reinforcement body 20 as the reinforcement layer.

More specifically, the liner 11 prepared in the liner preparing process S1 is inserted into the cylindrical member 21, and the opposite end portions of the liner 11 are covered with the domed members 22, 23. At this time, in this embodiment, the peripheral edge portions 21a at the opposite ends of the cylindrical member 21, which are located on the outer side, are fitted on the peripheral edge portions 22d, 23a of the domed members 22, 23, which are located on the inner side. The first resin layer 121 of the domed member 22 is exposed to the inner side (the liner 11 side), and the first resin layer 121 contains thermoplastic resin; therefore, the first resin layer 121 has higher adhesion to the liner 11, as compared with the case where the first resin layer 121 is formed of thermosetting resin. While the domed member 23 is formed from the third resin layer 125 containing thermosetting resin in this embodiment, the domed member 23 may also be formed of a resin layer containing thermoplastic resin and a resin layer containing thermosetting resin, like the domed member 22. In this case, the adhesion of the domed member 23 to the liner 11 can also be increased.

In this connection, the peripheral edge portions 22d, 23a of the domed members 22, 23, which are located on the outer side, may be fitted on the peripheral edge portions 21a at the opposite ends of the cylindrical member 21, which are located on the inner side, or the peripheral edge portions 22d, 23a of the domed members 22, 23 may be butted against and joined to the peripheral edge portions 21a at the opposite ends of the cylindrical member 21. Also, an adhesive (not shown) may be placed between the cylindrical member 21 and the domed members 22, 23.

In the outer reinforcement layer forming process S5, the outer reinforcement layer 13 in which fibers are placed over the two domed members 22, 23 is formed of fiber-reinforced resin, so as to cover the outer surface of the reinforcement body 20. As a result, the fiber-reinforced resin layer 12 having the reinforcement body 20 and the outer reinforcement layer 13 is formed. For example, fiber bundles impregnated with thermosetting resin may be helically wound over the outer surface of the reinforcement body 20, to form the outer reinforcement layer 13. Also, a plurality of fiber bundles impregnated with thermosetting resin may be attached to the outer surface of the reinforcement body 20, in a condition where the fiber bundles extend in the axial direction X of the reinforcement body 20, to form the outer reinforcement layer 13. The outer reinforcement layer 13 may also be formed, using a so-called sheet winding process, by winding a fiber sheet impregnated with thermosetting resin, around the outer surface of the reinforcement body 20. Then, the thermosetting resin contained in the outer reinforcement layer 13 is heated and cured. As the thermosetting resin and fiber bundles included in the outer reinforcement layer 13, the same thermosetting resin and fiber bundles as those that form the domed members 22, 23 may be used, for example.

Then, the valve 15 is attached to the valve fixture 14, so that the high-pressure tank 10 is completed. While the valve 15 is attached to the protruding portion 22b via the valve fixture 14 in this embodiment, the disclosure is not limited to this arrangement. For example, the valve 15 may be directly attached to the outer circumferential surface of the protruding portion 22b, without interposing the valve fixture 14 between the valve 15 and the protruding portion 22b. In this case, the valve 15 may be fixed by caulking to the outer circumferential surface of the protruding portion 22b.

Figure 11:
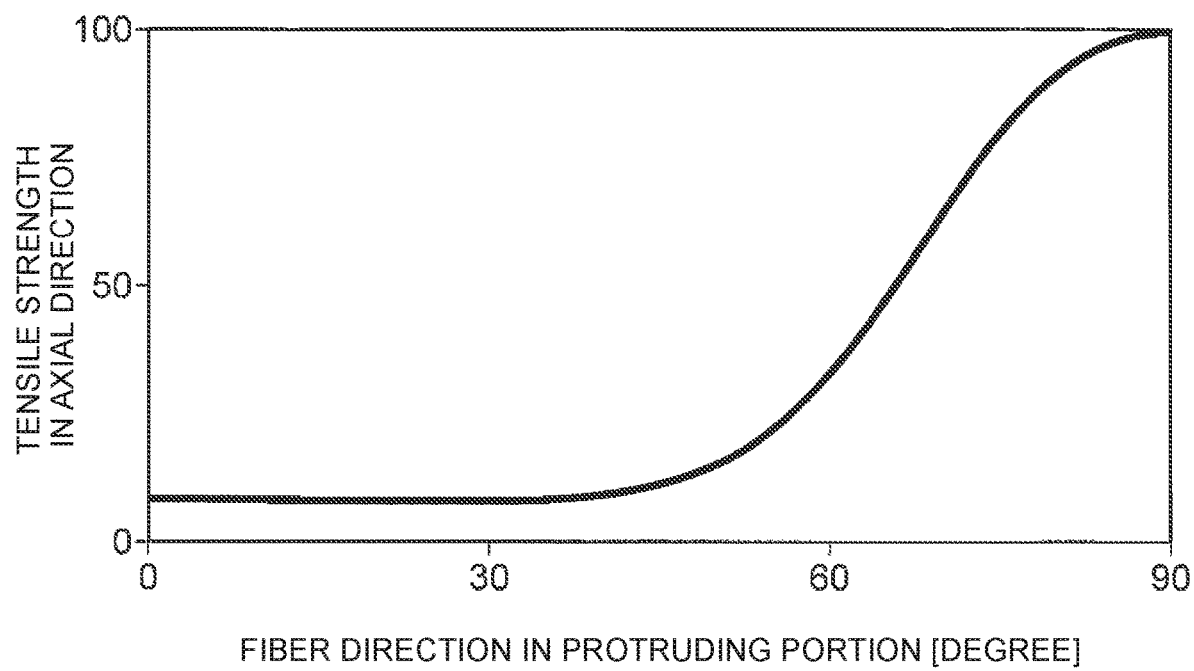
FIG. 11 is a view useful for describing the relationship between the fiber direction in a producing portion and the tensile strength in the axial direction.

Next, the relationship between the fiber direction in the protruding portion 22b of the first resin layer 121 and the tensile strength as measured in the axial direction X will be described. As shown in FIG. 11, where the tensile strength in the axial direction X when the fiber direction of the first resin layer 121 in the protruding portion 22b is parallel to (90 degrees in FIG. 11) the axial direction X is defined as 100, the tensile strength is reduced to about 90, 65, and 33 if the fiber direction is inclined 10 degrees, 20 degrees, and 30 degrees (corresponding to 80 degrees, 70 degrees, and 60 degrees in FIG. 11), respectively, with respect to the axial direction X. Normally, the angle formed by the FW process is 0 to 30 degrees in FIG. 11; therefore, the tensile strength will be about 8 if the protruding portion 22b is formed by the FW process.

In this embodiment, the first resin layer 121 is formed such that the fiber direction in the protruding portion 22b follows the axial direction X of the protruding portion 22b, more specifically, such that the angle of inclination of the fiber direction with respect to the axial direction X is 20 degrees or smaller, preferably, 10 degrees or smaller, and more preferably, 0 degree (corresponding to 70 degrees or larger, 80 degrees or larger, and 90 degrees in FIG. 11, respectively). With this arrangement, sufficient tensile strength of the protruding portion 22b can be secured.

In this embodiment, the fiber bundles F1 are positioned such that the fiber direction in the protruding portion 22b follows the axial direction X of the protruding portion 22b, as described above. Thus, sufficient tensile strength of the protruding portion 22b in the axial direction can be secured. Also, the fiber bundles F1 are arranged to extend continuously from the protruding portion 22b to the domed main body 22a, and the fiber bundles F2 are placed over the fiber bundles F1. As a result, the fiber bundles F2 restrain movement of the fiber bundles F1, and can prevent the protruding portion 22b from being pulled out of the domed main body 22a. Also, since the fiber bundles F2 are provided such that the fiber direction of the fiber bundles F2 intersects with the fiber direction of the fiber bundles F1, the tensile strength in other directions, such as radial directions, as well as the tensile strength in the axial direction X, can be secured. Accordingly, the protruding portion 22b is less likely or unlikely to be damaged, even when the pressure within the high-pressure tank 10 becomes high, and large force is applied outward in the axial direction X to the valve 15 attached to the distal end of the protruding portion 22b, whereby large force is also applied outward in the axial direction X to the protruding portion 22b. Thus, there is no need to provide a cap, and the weight of the high-pressure tank 10 can be reduced.

Also, as described above, the first resin with which the fiber bundles F1 are impregnated is thermoplastic resin, and the second resin with which the fiber bundles F2 are impregnated is thermosetting resin. With the first resin with which the fiber bundles F1 are impregnated being the thermoplastic resin, when the fiber bundles F1 are placed on the surface of the mandrel 200 or liner 11, for example, in a condition where the first resin is softened, heat of the fiber bundles F1 is removed by or lost to the mandrel 200 or liner 11, and the resin with which the fiber bundles F1 are impregnated is solidified. Then, the fiber bundles F2 are placed on the fiber bundles F1 in a condition where the first resin is solidified. Thus, the fiber bundles F1 are not deflected or displaced when the fiber bundles F2 are placed thereon, and the tensile strength of the protruding portion 22b in the axial direction X is less likely or unlikely to be reduced. Also, since the second resin with which the fiber bundles F2 are impregnated is thermosetting resin, the mechanical strength of the protruding portion 22b after the second resin is cured can be easily improved.

Second Embodiment

In the second embodiment, the fiber bundles F1 impregnated with thermoplastic resin form the inside surfaces (surfaces that are in contact with hydrogen gas, as will be described later) of the domed members 22, 23, unlike the first embodiment.

Figure 12:
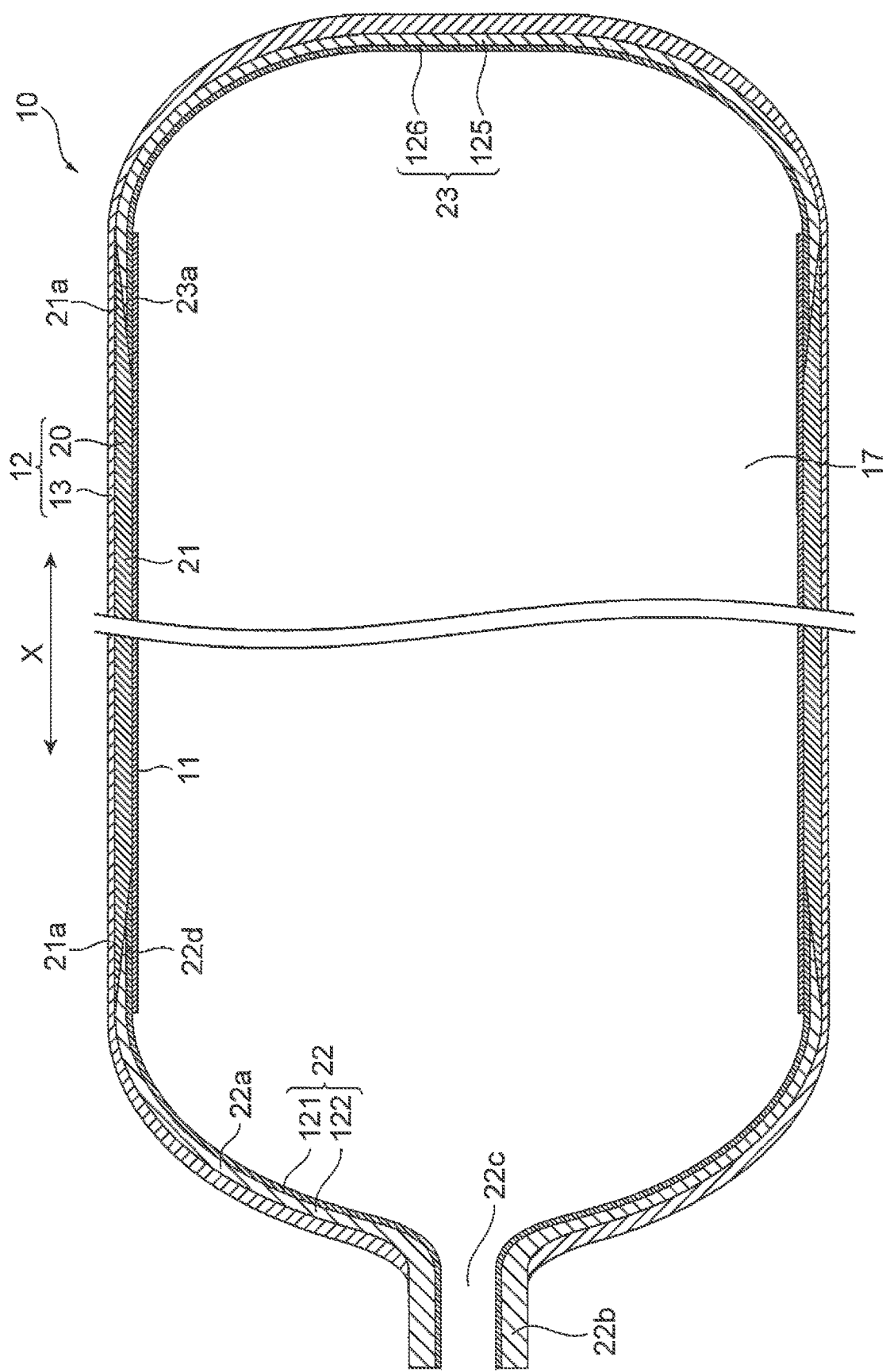
FIG. 12 is a cross-sectional view showing the structure of a high-pressure tank according to a second embodiment of the disclosure.

In the high-pressure tank 10 of this embodiment, the liner 11 is formed solely of a cylindrical portion, as shown in FIG. 12.

In this embodiment, the domed member 22 consists of a first resin layer 121, and a second resin layer 122 formed to cover the first resin layer 121. Unlike the first embodiment, the first resin layer 121 is formed over the entire area of the inside surface (surface that is in contact with hydrogen gas, namely, the inner surface of the domed main body 22a and the inner surface of the protruding portion 22b).

Also, unlike the first embodiment, the domed member 23 consists of a fourth resin layer 126, and a third resin layer 125 that covers the fourth resin layer 126. The fourth resin layer 126 consists of fiber bundles impregnated with thermoplastic resin, and is formed over the entire area of the inside surface (surface that is in contact with hydrogen gas).

Namely, the domed members 22, 23 have gas barrier properties over the entire areas of the inside surfaces, and have the same functions as the dome-like opposite end portions of the liner 11 of the first embodiment. Thus, in this embodiment, the liner 11 is formed in a cylindrical shape, which is open at its opposite ends. Then, the cylindrical liner 11, first resin layer 121, and fourth resin layer 126 form the housing space 17 that is filled with hydrogen gas.

The other structures of the second embodiment are substantially identical with those of the first embodiment.

Next, a method of producing the high-pressure tank 10 according to the second embodiment of the disclosure will be described. In this embodiment, in the liner preparing process S1, the cylindrical liner 11 that is open at its opposite ends is prepared. The method of producing the liner 11 is not limited to any particular method, but the liner 11 may be produced using a known technology.

As in the first embodiment, the domed member forming process S2 includes the first resin layer forming process S21, second resin layer forming process S22, and removing process S23, as shown in FIG. 3.

Figure 13:
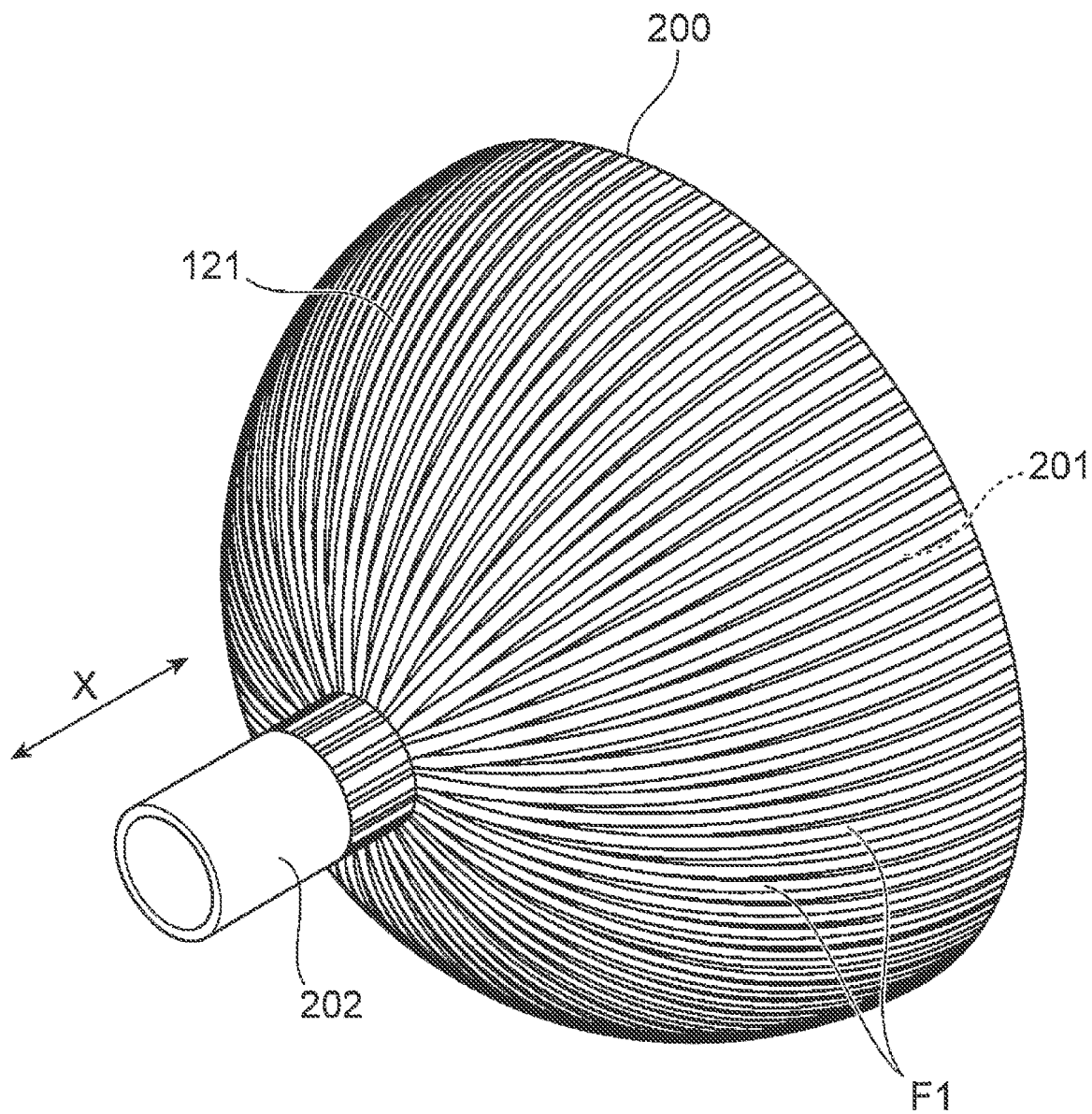
FIG. 13 is a perspective view useful for describing a domed member forming process of a method of producing the high-pressure tank according to the second embodiment of the disclosure.

In the first resin layer forming process S21, the first resin layer 121 is formed so as to cover the entire area of the outer surface of the mandrel 200, as shown in FIG. 13. At this time, all of the fiber bundles F1 may be attached to the mandrel 200 so as to spread radially (in radial directions) from the shaft portion 202 of the mandrel 200, as shown in FIG. 13, or the fiber bundles F1 may be additionally attached to the mandrel 200 at various angles, from the condition shown in FIG. 4 or FIG. 6, for example, such that the fiber bundles F1 intersect with those shown in FIG. 4 or FIG. 6. In this manner, the first resin layer 121 of the domed member 22 is formed.

While the fourth resin layer 126 of the domed member 23 may be formed in substantially the same manner as that of forming the first resin layer 121, the fourth resin layer 126 may not be provided such that it spreads radially from the shaft portion 202 of the mandrel 200, since the domed member 23 does not have the protruding portion 22b. Also, the domed member 23 may be formed at the same time (in the same process) as the domed member 22, as in the first embodiment.

The other processes in the production method of the second embodiment are substantially the same as those of the first embodiment.

In the second embodiment, when the domed members 22, 23 are formed, the fiber bundles F1 form the surfaces of the domed members 22, 23 which contact with hydrogen gas. Since the thermoplastic resin has gas barrier properties, there is no need to provide the liner 11 (its dome-like opposite end portions) along the inner surfaces of the domed members 22, 23, when the fiber bundles F1 impregnated with thermoplastic resin form the surfaces of the domed members 22, 23 which contact with hydrogen gas. Thus, the weight of the high-pressure tank 10 can be further reduced.

The other effects of the second embodiment are substantially the same as those of the first embodiment.

Third Embodiment

In the third embodiment, an insert 16 for mounting a valve 18 made of metal is placed inside the protruding portion 22b of the domed member 22, unlike the first embodiment.

Figure 15:
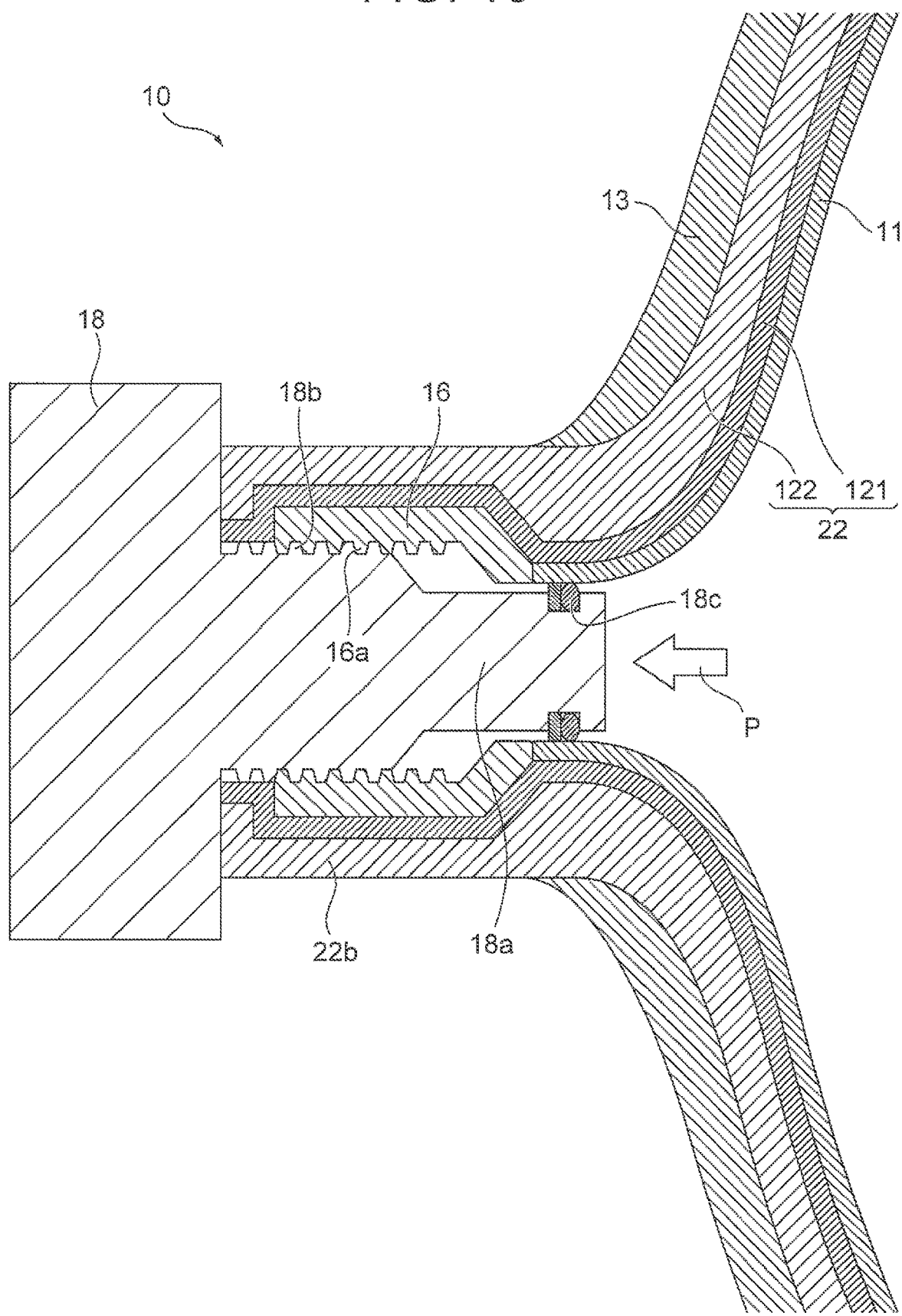
FIG. 15 is a cross-sectional view showing the structure of a high-pressure tank according to a third embodiment of the disclosure.

In the high-pressure tank 10 of this embodiment, the insert 16 made of metal and having a cylindrical shape, for example, is placed inside the protruding portion 22b of the domed member 22, as shown in FIG. 15. In this embodiment, the domed member 22 consists of the liner 11, insert 16, first resin layer 121 formed to cover the liner 11 and the insert 16, and second resin layer 122 formed to cover the first resin layer 121.

The insert 16 has a female thread 16a on its inner circumferential surface. The insert 16 is placed inside the first resin layer 121 of the domed member 22, such that it adjoins a distal end of a cylindrical protruding portion of the liner 11 as viewed in the axial direction. The insert 16, which has a cylindrical shape, has a tapered, inner end portion as viewed in the axial direction of the high-pressure tank 10, namely, the diameter of the inner end portion of the insert 16 is gradually reduced.

The valve 18 is formed with an inserted portion 18a that is inserted in the protruding portion 22b. On the outer circumferential surface of the inserted portion 18a, a male thread 18b that engages with the female thread 16a of the insert 16, and a seal member 18c that seals the housing space 17, are provided. Although not illustrated in the drawings, the valve 18 is formed with a passage through which hydrogen gas passes, like the passage 15d of the valve 15 of the first embodiment as shown in FIG. 1.

The other structures of the third embodiment are substantially identical with those of the first embodiment.

Next, a method of producing the high-pressure tank 10 according to the third embodiment of the disclosure will be described. In this embodiment, in the first resin layer forming process S21 for placing the fiber bundles F1 (first fiber bundles), the insert 16 having the female thread 16a on the inner circumferential surface is supported by the outer periphery of a distal end portion of the shaft portion 202 of the mandrel 200 shown in FIG. 4. Then, the fiber bundles F1 are placed over the outer periphery of the insert 16 and the outer periphery of the mandrel 200.

Figure 14:
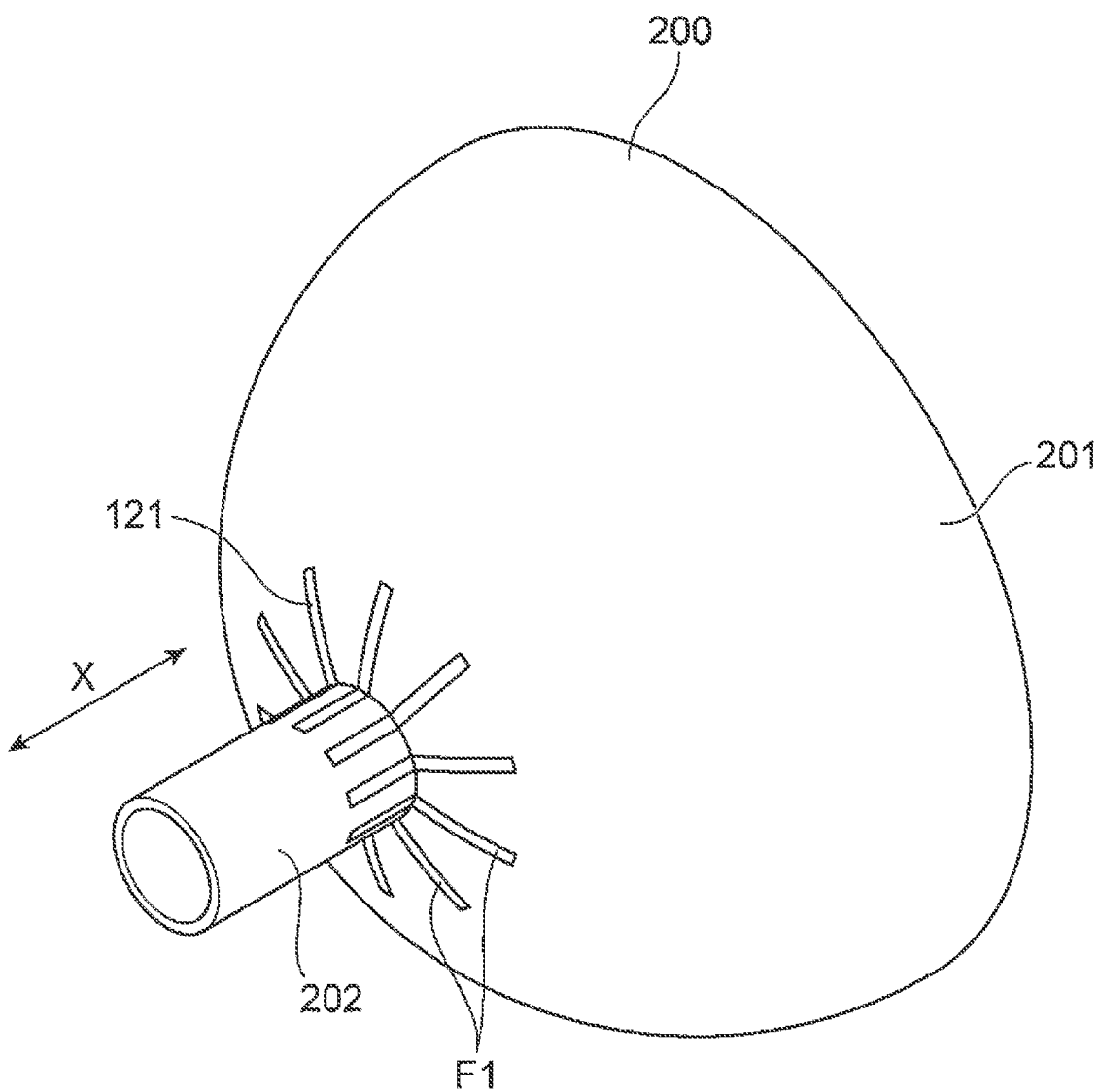
FIG. 14 is a perspective view useful for describing a domed member forming process of the method of producing the high-pressure tank according to a modified example of the disclosure.

The other processes of the production method of the third embodiment are substantially the same as those of the first embodiment. More specifically, in the first resin layer forming process S21 similar to that of the first embodiment, the first resin layer 121 is formed on the outer surface of the insert 16 and the outer surface of the mandrel 200, as shown in FIG. 4 or FIG. 14. Here, as in the first embodiment, the fiber bundles F1 that constitute the first resin layer 121 are placed on the insert 16 and the shaft portion 202, such that the fiber direction follows the axial direction X of the shaft portion 202 (the fiber direction is in parallel with the axial direction X in this embodiment). Thus, in the first resin layer 121 of the protruding portion 22b shown in FIG. 15, the fiber bundles F1 are positioned so as to extend along the axial direction of the protruding portion 22b (in parallel with the axial direction of the protruding portion 22b in this embodiment).

Figure 16:
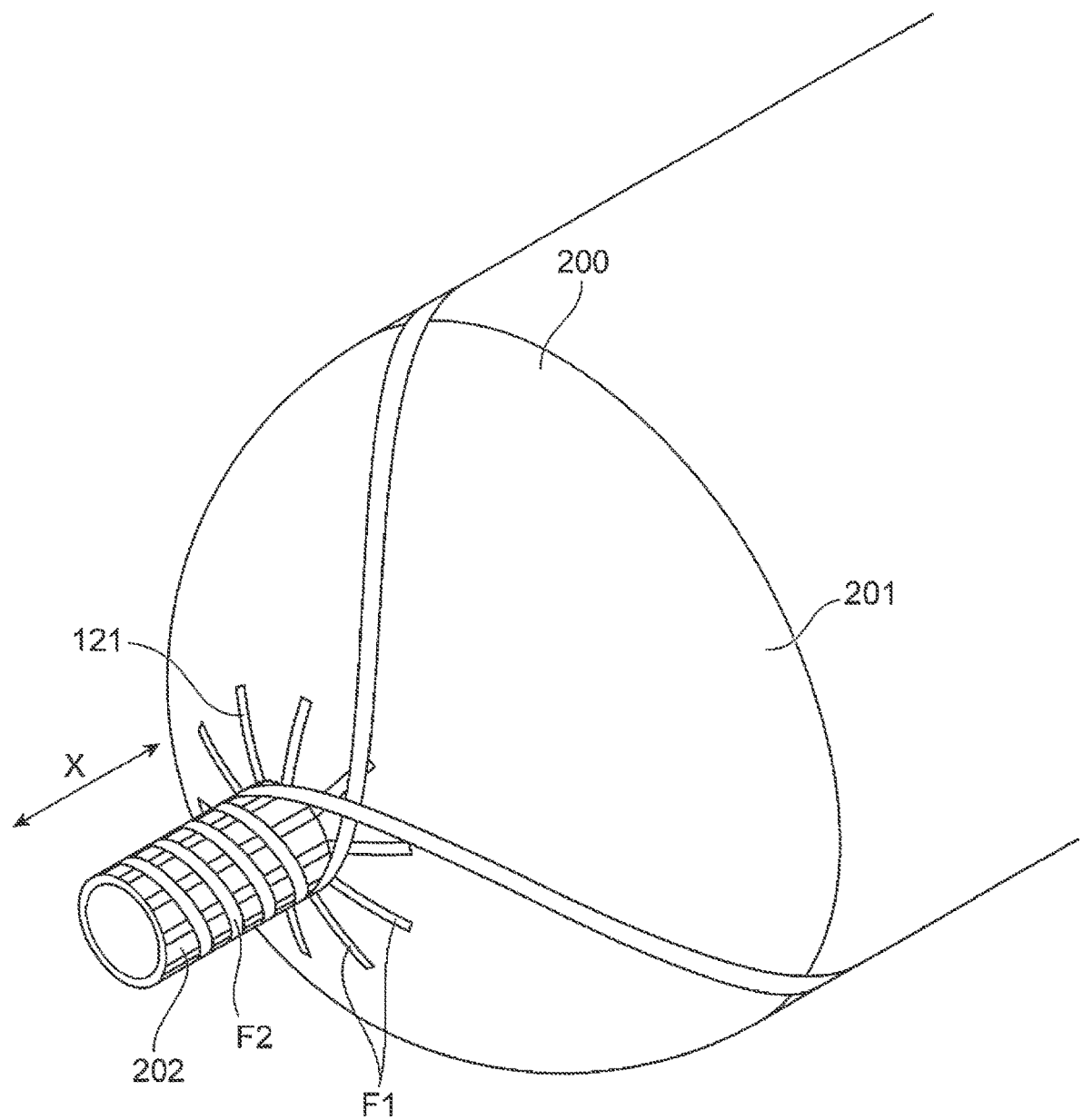
FIG. 16 is a perspective view useful for describing a domed member forming process of a method of producing the high-pressure tank according to the third embodiment of the disclosure.

In the second resin layer forming process S22 similar to that of the first embodiment, the second resin layer 122 is formed on the outer surface of the mandrel 200, so as to cover the first resin layer 121 (namely, the fiber bundles F1 impregnated with the first resin), as shown in FIG. 16. At this time, the fiber bundles F2 that constitute the second resin layer 122 are placed on at least the outer periphery of the insert 16 and the outer periphery of the shaft portion 202, such that the fiber direction of the fiber bundles F2 intersects with the fiber direction of the fiber bundles F1 (at right angles, or at an angle equal to or larger than 80 degrees, in this embodiment).

Also, the fiber bundles F2 wound on the outer periphery of the insert 16 and the outer periphery of the shaft portion 202 are wound continuously from the outer periphery of the insert 16 and the outer periphery of the shaft portion 202, to the outer periphery of the dome-like mandrel 200. With the fiber bundles F2 thus wound integrally and continuously from the insert 16 and shaft portion 202 to the mandrel 200, the second resin layer 122 that extends continuously from the protruding portion 22b of the domed member 22 shown in FIG. 15 to its dome-like portion is formed integrally by winding.

Figure 17:
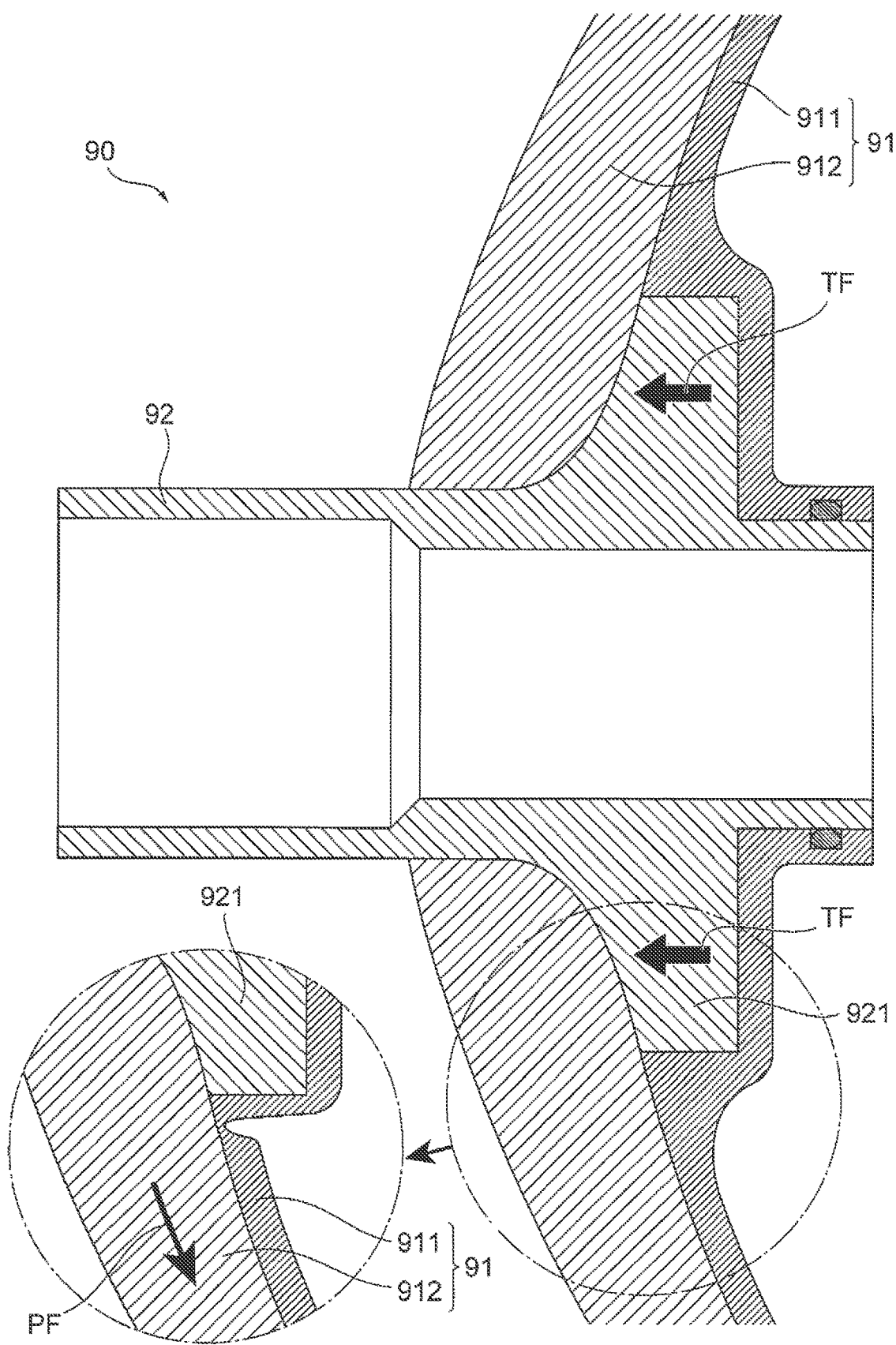
FIG. 17 is a cross-sectional view showing one example of the structure of a known high-pressure tank.

As shown in FIG. 17, a known high-pressure tank 90 includes a tank main body 91, and a cap 92 attached to an open, longitudinal end portion of the tank main body 91. The tank main body 91 includes a liner 911 for airtightly holding hydrogen gas, and a reinforcement layer 912 that is reinforced by winding fiber bundles impregnated with resin on its outer surface. The cap 92 has a flange portion 921 of which the diameter is larger than that of the other portion, on the inner side as viewed in the axial direction of the high-pressure tank 900. The cap 92 has a female thread or a male thread, and a valve (not shown) is screwed and attached to the cap 92.

Figure 18:
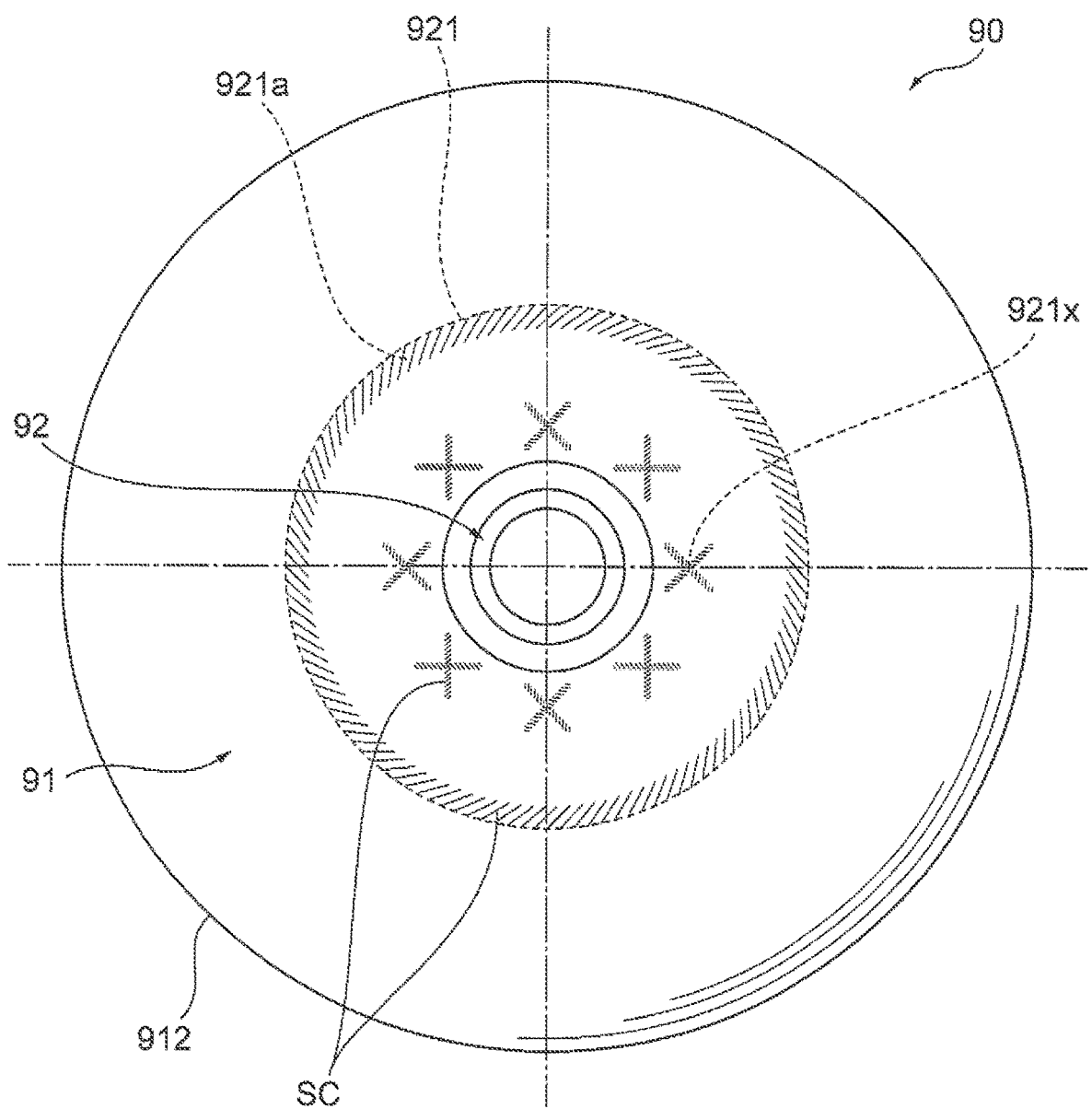
FIG. 18 is a top view showing one example of stress distribution in the known high-pressure tank.

In the known high-pressure tank 90, thrust force TF is applied outward in the axial direction of the high-pressure tank 90, from the flange portion 921 of the cap 92 which receives the internal pressure of the high-pressure tank 90, to the reinforcement layer 912. As shown in FIG. 18, the thrust force TF increases stress applied to fibers, at an outer edge portion 921a of the flange portion 921 of the cap 92, and fiber crossing portions 921x on the flange portion 921 of the cap 92, and stress concentrated portions SC are generated in the high-pressure tank 900. Also, during low-temperature filling of the high-pressure tank 900, tensile force PF may be applied to the reinforcement layer 912 at an outer peripheral portion of the flange portion 921 of the cap 92, as shown in FIG. 17, due to a difference in the linear expansion coefficient between the reinforcement layer 912 and the cap 92, and the liner 911 may be extended and damaged.

On the other hand, in the method of producing the high-pressure tank 10 according to this embodiment, the fiber bundles F1 are placed on the outer periphery of the insert 16 having the female thread 16a on the inner circumferential surface, in the process of placing the fiber bundles F1 (first fiber bundles). Thus, the high-pressure tank 10 in which the cylindrical insert 16 is placed inside the protruding portion 22b of the domed member 22, and the insert 16 has the female thread 16a on the inner circumferential surface, can be produced.

Thus, the male thread 18b on the outer circumferential surface of the valve 18 is engaged with the female thread 16a on the inner circumferential surface of the insert 16, so that the valve 18 can be attached to the cylindrical insert 16 placed inside the protruding portion 22b. With this arrangement, the tensile force generated due to the internal pressure P of the high-pressure tank 10 is applied to the entire periphery of a connecting portion of the domed main body 22a and protruding portion 22b of the domed member 22, and stress is prevented from concentrating in particular portions, such as crossing portions of the fiber bundles F1, F2.

Thus, even when the internal pressure P of the high-pressure tank 10 is applied to the valve 18, and tensile force is applied outward in the axial direction of the high-pressure tank 10 to the protruding portion 22b, stress concentration on particular portions can be avoided, and the rate of utilization of the strength of the fiber bundles F1, F2 can be improved. Accordingly, the amount of use of the fiber bundles F1, F2 can be reduced, and the weight of the high-pressure tank 10 can be reduced. Further, with stress concentration thus prevented, the liner 11 can be prevented from being damaged.

The fiber bundles F1 (first fiber bundles) may be placed on the outer periphery of the fiber bundles F2 (second fiber bundles) placed on the outer periphery of the insert 16, and the fiber bundles F2 may be further placed on the outer periphery of the fiber bundles F1, so that an intermediate layer may be placed between the fiber bundles F2. In this case, the fiber bundles F2 can be bonded to the opposite surfaces of the fiber bundles F1.

The other effects of the third embodiment are substantially the same as those of the first embodiment.

The embodiments disclosed herein should be considered as not being restrictive but being exemplary in all respects. The scope of the disclosure is defined by the appended claims, rather than the above description of the embodiments, and includes all changes within the meaning and range of the claims and equivalents thereof.

In the illustrated embodiments, the two domed members and the cylindrical member are separately formed, and then joined together, so as to form the reinforcement body as the reinforcement layer. However, the disclosure is not limited to this. For example, the first fiber bundles and second fiber bundles may be placed on a surface of a liner made of resin and formed by a known production method, so that the cylindrical member and two domed members of the reinforcement layer are formed at the same time. In this case, the process of joining the cylindrical member and the two domed members is not needed.

While the first fiber bundles are impregnated with thermoplastic resin in the illustrated embodiments, the disclosure is not limited to this, but the first fiber bundles may be impregnated with thermosetting resin. In this case, in the process of placing the first fiber bundles, hot air may be applied to the first fiber bundles while the first fiber bundles are being placed, so that the thermosetting resin with which the first fiber bundles are impregnated is cured and solidified. However, since it is easier to solidify thermoplastic resin, the first fiber bundles are preferably impregnated with the thermoplastic resin.

In the illustrated embodiments, the second fiber bundles are impregnated with thermosetting resin. However, the disclosure is not limited to this, but the second fiber bundles may be impregnated with thermoplastic resin. It is, however, preferable to impregnate the second fiber bundles with thermosetting resin, in terms of the mechanical strength.

In the illustrated embodiments, the first resin layer 121 is placed to extend from the protruding portion 22b to the peripheral edge portion of the domed main body 22a. However, the disclosure is not limited to this, but the first resin layer 121 is not required to extend to the peripheral edge portion of the domed main body 22a, provided that it is placed to extend from the protruding portion 22b to the domed main body 22a. Namely, as shown in FIG. 14, for example, the fiber bundles F1 are not required to extend to the peripheral edge portion of the main body 201 of the mandrel 200, provided that it is placed to extend from the shaft portion 202 to the main body 201.

While the cylindrical member is formed by a single member in the illustrated embodiments, the disclosure is not limited to this. For example, the cylindrical member may be formed by two or more members. In this case, after the two or more cylindrical members are joined together, domed members may be joined to the opposite ends of the assembly. Also, after one of the cylindrical members is joined to each of the domed members, the cylindrical members with the domed members may be joined together.

In the illustrated embodiments, after the liner is prepared, the cylindrical member and the domed members are placed over the liner, and joined together. However, the disclosure is not limited to this. For example, after the cylindrical member and the domed members are joined together to form the reinforcement body, the liner may be formed inside the reinforcement body. In this case, the liner may be formed by reaction injection molding, using two or more types of low-molecular-weight, low-viscosity liquid materials having fluidity at ordinary temperatures, as the resin material. Also, the liner may be formed by blow molding, for example, by extruding a resin material that is heated and softened, into the reinforcement body in a cylindrical shape, and feeding compressed air to the inside of the cylindrical resin material. Also, the liner may be formed by thermal spraying, for example, by spraying a resin material that is liquefied or softened, onto the inner surface of the reinforcement body.

What is claimed is:

1. A method of producing a high-pressure tank, the high-pressure tank including a liner that contains gas, and a reinforcement layer that is made of fiber-reinforced resin and covers an outer surface of the liner, the reinforcement layer having a cylindrical member, and two domed members provided at opposite ends of the cylindrical member and formed integrally with the cylindrical member, one of the domed members including a domed main body, and a cylindrical protruding portion that protrudes from the domed main body and has a gas channel used for filling and discharge of the gas, the method comprising:
a process of forming at least the one of the domed members,
wherein the process of forming at least the one of the domed members includes
placing first fiber bundles impregnated with a first resin, such that the first fiber bundles form a part of the protruding portion and a part of the domed main body, and placing second fiber bundles impregnated with a second resin, such that the second fiber bundles cover the first fiber bundles, wherein the first fiber bundles are placed, such that a fiber direction of the first fiber bundles in the protruding portion follows an axial direction of the protruding portion, and the first fiber bundles extend continuously from the protruding portion to the domed main body, and the first resin with which the first fiber bundles are impregnated is solidified while the first fiber bundles are being placed, and wherein the second fiber bundles are placed, such that a fiber direction of the second fiber bundles intersects with the fiber direction of the first fiber bundles.

2. The method of producing the high-pressure tank according to claim 1, wherein:

the first resin is thermoplastic resin;

the second resin is thermosetting resin;

while the first fiber bundles are placed in a condition where the first resin is softened, the first resin with which the first fiber bundles are impregnated is solidified; and the second fiber bundles are placed in a condition where the second resin is uncured, and then the second resin is heated and cured.

3. The method of producing the high-pressure tank according to claim 2, wherein, when the two domed members are formed, surfaces of the domed members which contact with the gas are formed by the first fiber bundles.

4. A high-pressure tank comprising:

a liner configured to contain gas; and a reinforcement layer made of fiber-reinforced resin and configured to cover an outer surface of the liner, the reinforcement layer having a cylindrical member, and two domed members provided at opposite ends of the cylindrical member and formed integrally with the cylindrical member, one of the domed members including a domed main body, and a protruding portion that protrudes from the domed main body, and has a gas channel used for filling and discharge of the gas, wherein the domed main body and the protruding portion are formed by first fiber bundles impregnated with a first resin and second fiber bundles impregnated with a second resin, wherein the first fiber bundles constitute a part of the protruding portion and a part of the domed main body, and are placed continuously from the protruding portion to the domed main body, such that a fiber direction of the first fiber bundles in the protruding portion follows an axial direction of the protruding portion, and wherein the second fiber bundles cover the first fiber bundles, and are placed such that a fiber direction of the second fiber bundles intersects with the fiber direction of the first fiber bundles.

5. The high-pressure tank according to claim 4, wherein:

the first resin is thermoplastic resin;

the second resin is thermosetting resin; and surfaces of the domed members which contact with the gas are formed by the first fiber bundles.

6. The method of producing the high-pressure tank according to claim 1, wherein the first fiber bundles are placed on an outer periphery of an insert that is placed inside the protruding portion and has a female thread on an inner circumferential surface.

7. The high-pressure tank according to claim 4, wherein:

a cylindrical insert is placed inside the protruding portion; and the insert has a female thread on an inner circumferential surface.

* * * * *